United States Patent
Hirose et al.

(10) Patent No.: US 10,270,852 B2
(45) Date of Patent: Apr. 23, 2019

(54) DATA MIGRATION APPARATUS AND SYSTEM

(71) Applicant: FUJITSU LIMITED, Kawasaki-shi, Kanagawa (JP)

(72) Inventors: Atsuhito Hirose, Odawara (JP); Toshiaki Yamada, Mishima (JP); Tamaki Tanaka, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 209 days.

(21) Appl. No.: 14/991,252

(22) Filed: Jan. 8, 2016

(65) Prior Publication Data

US 2016/0234304 A1    Aug. 11, 2016

(30) Foreign Application Priority Data

Feb. 9, 2015  (JP) .................................. 2015-023203

(51) Int. Cl.
*H04L 29/08*  (2006.01)

(52) U.S. Cl.
CPC ...... *H04L 67/1095* (2013.01); *H04L 67/1097* (2013.01)

(58) Field of Classification Search
CPC .................. H04L 67/1095; H04L 67/1097
See application file for complete search history.

(56) References Cited

U.S. PATENT DOCUMENTS

| | | | | |
|---|---|---|---|---|
| 6,041,357 A * | 3/2000 | Kunzelman | ......... | H04L 63/0815 709/228 |
| 6,182,139 B1 * | 1/2001 | Brendel | .................. | H04L 29/06 709/201 |
| 7,814,210 B1 * | 10/2010 | Mueller | .............. | H04L 67/1095 709/203 |
| 2005/0038849 A1 * | 2/2005 | Kaluskar | ........... | G06F 17/30575 709/203 |
| 2005/0267888 A1 | 12/2005 | Kan et al. | | |
| 2007/0288474 A1 | 12/2007 | Baba et al. | | |
| 2011/0022812 A1 * | 1/2011 | van der Linden | .... | G06F 9/5077 711/163 |
| 2013/0054813 A1 * | 2/2013 | Bercovici | ............. | G06F 9/4856 709/226 |

FOREIGN PATENT DOCUMENTS

| | | |
|---|---|---|
| JP | 2005-339079 | 12/2005 |
| JP | 2007-328711 | 12/2007 |
| JP | 2009-59201 A | 3/2009 |
| JP | 2013-175117 | 9/2013 |

OTHER PUBLICATIONS

Japanese Office Action dated Aug. 14, 2018 for corresponding Japanese Patent Application No. 2015-023203, with English Translation, 7 pages.

* cited by examiner

*Primary Examiner* — Scott B Christensen
(74) *Attorney, Agent, or Firm* — Fujitsu Patent Center

(57) ABSTRACT

An information processing apparatus accepts migration of data from a migration source information processing apparatus. The information processing apparatus includes a processor to execute an operation for operation target data as a target of a processing request given from a client apparatus when the operation target data is migrated from the migration source information processing apparatus and the processing request is received from the migration source information processing apparatus, and to notify the client apparatus of a processing result of the operation, the result containing arrangement information of the operation target data.

3 Claims, 38 Drawing Sheets

FIG.9A

| COLUMN NAME | TYPE | SETTING VALUE |
|---|---|---|
| COLUMN1 | CHAR | ABCDEFGHIJK |
| COLUMN2 | INTEGER | -32,768 ~ +32,767 |

TABLE DEFINITION OF RDBMS

FIG.9B

| KEY | | | VALUE | | |
|---|---|---|---|---|---|
| IDENTIFIER | TYPE NAME | SETTING VALUE | IDENTIFIER | TYPE NAME | SETTING VALUE |
| KEY1 | INTEGER | -32,768 ~ +32,767 | VALUE1 | CHAR | ABCDEFGHIJK |

TABLE DEFINITION OF KVS

FIG.9C

| DATA SET NAME | COLUMN NAME OR KEY NAME | RANGE OF VALUE | ARRANGEMENT SERVER |
|---|---|---|---|
| Partition01 | COLUMN2 or KEY1 | 0~10000 | SV01 |
| Partition02 | COLUMN2 or KEY1 | 10001~20000 | SV01 |
| Partition03 | COLUMN2 or KEY1 | 20001~30000 | SV01 |

ARRANGEMENT DEFINITION OF DATA SET

FIG.10

| DATA SET NAME | MIGRATION STATE | TRANSACTION ID |
|---|---|---|
| Partition01 | NOT YET MIGRATED (0) | 15896231 |
| Partition02 | MIGRATED IN PROGRESS (1) | 0 |
| Partition03 | ALREADY MIGRATED (2) | 0 |

DATA MIGRATION LIST

FIG.11

| DATA SET NAME | MIGRATION STATE | TRANSACTION ID |
|---|---|---|
| Partition01 | NOT YET MIGRATED (0) | 0 |
| Partition02 | MIGRATED IN PROGRESS (1) | 0 |
| Partition03 | ALREADY MIGRATED (2) | 15896231 |

MIGRATED DATA LIST

FIG.12

| CLIENT NAME | CLIENT NOTIFICATION STATE |
|---|---|
| CLI01 | ALREADY NOTIFIED (2) |
| CLI02 | ALREADY NOTIFIED (2) |
| CLI03 | NOT YET NOTIFIED (0) |

CLIENT NOTIFICATION LIST

FIG.13

| ITEMS | | SETTING VALUE |
|---|---|---|
| CONNECTION COUNT | | 1000 |
| CONNECTION INFORMATION (CORRESPONDING TO CONNECTION COUNT) | | |
| | CONNECTION ID | 102367598 |
| | CLIENT NAME | CLI01 |
| | CLIENT PORT NUMBER | 80 |
| | TRANSACTION ID | 15896231 |

CONNECTION INFORMATION LIST

FIG.14

| ITEM | SETTING VALUE |
|---|---|
| TRANSACTION ID | 15896231 |
| CONNECTION ID | 102367598 |
| TRANSACTION STATE | CONTINUE |
| TRANSACTION TYPE | ReadOnly |
| CURSOR STATE | OPEN |
| TABLE NAME | TBL01 |
| DATA SET NAME | Partition01 |
| CURSOR POSITION | 101 |
| UPDATE DATA | NONE |

TRANSACTION LOG

FIG.15

| ITEM | SETTING VALUE |
|---|---|
| DATA SET NAME | Partition01 |
| DATA SET DATA LENGTH | 102400 |
| TRANSACTION ID | 15896231 |
| TRANSACTION LOG DATA LENGTH | 1024 |
| DATA PART OF DATA SET | |
| DATA PART OF TRANSACTION LOG | |

MIGRATION DATA

FIG.16

| DEFINITION PARAMETER | SETTING VALUE |
|---|---|
| CommunicationControlMultiplicity | 4 |
| ServerTimeOut | 3 |
| ScaleoutTimeOut | 180 |

SERVER SIDE: DEFINITION FILE

FIG.17

| ITEM | SETTING VALUE |
|---|---|
| DATA SET ELEMENT COUNT | 5 |
| COMBINATION 1<br>OF DATA SET AND CONNECTING DESTINATION | |
|     DATA SET NAME | Partition00 |
|     CONNECTING DESTINATION SERVER NAME | SV01 |
| COMBINATION 2<br>OF DATA SET AND CONNECTING DESTINATION | |
|     DATA SET NAME | Partition01 |
|     CONNECTING DESTINATION SERVER NAME | SV02 |
| COMBINATION 3<br>OF DATA SET AND CONNECTING DESTINATION | |
|     DATA SET NAME | Partition02 |
|     CONNECTING DESTINATION SERVER NAME | SV02 |
| COMBINATION 4<br>OF DATA SET AND CONNECTING DESTINATION | |
|     DATA SET NAME | Partition03 |
|     CONNECTING DESTINATION SERVER NAME | SV02 |
| COMBINATION 5<br>OF DATA SET AND CONNECTING DESTINATION | |
|     DATA SET NAME | Partition04 |
|     CONNECTING DESTINATION SERVER NAME | SV01 |

DATA SET CONNECTING DESTINATION LIST

FIG.18

| ITEM | SETTING VALUE |
| --- | --- |
| SERVER CONNECTING DESTINATION ELEMENT COUNT | 2 |
| SERVER CONNECTING DESTINATION INFORMATION 1 | |
| SERVER NAME | SV01 |
| PORT NUMBER | 80 |
| SERVER CONNECTING DESTINATION INFORMATION 2 | |
| SERVER NAME | SV02 |
| PORT NUMBER | 80 |

SERVER CONNECTING DESTINATION LIST

FIG.19

| DEFINITION PARAMETER | SETTING VALUE |
| --- | --- |
| ClientTimeOut | 3 |
| ClientPort | 80 |
| ServerName | SV01 |
| ServerPort | 80 |
| ServerName | SV02 |
| ServerPort | 80 |
| DataLocatedServer | Partition00:SV01 |
| DataLocatedServer | Partition01:SV02 |

CLIENT SIDE: DEFINITION FILE

FIG.20

| ITEM | SETTING VALUE |
|---|---|
| SERVER NAME | 101.23.11.501 |
| SERVER PORT NUMBER | 80 |
| CLIENT ID | CL001 |
| REQUEST DATA NUMBER | 000000001 |
| CLIENT NAME | CLI001 |
| CLIENT PORT NUMBER | 80 |
| CLIENT PROCESS ID | 4438 |
| CLIENT THREAD ID | 47470217350064 |
| CONNECTION ID | 102367598 |
| REQUEST DATA TRANSMISSION TIME | 2013.8.19 15:32:32.225 |
| PROCESSING REQUEST TYPE | SELECT |
| PROCESSING REQUEST TARGET | TABLE1 |
| PROCESSING REQUEST INPUT INFORMATION | WHERE COLUMN2=5 |
| PROCESSING REQUEST OUTPUT INFORMATION | COLUMN1 |

REQUEST DATA

FIG.21

| ITEM | SETTING VALUE |
|---|---|
| CLIENT NAME | 101.23.11.501 |
| CLIENT PORT NUMBER | 80 |
| CLIENT ID | CL001 |
| REQUEST DESTINATION SERVER NAME | 101.24.12.101 |
| RESULT TRANSMISSION SERVER NAME | 101.24.12.102 |
| RESULT DATA | |
|     REQUEST DATA NUMBER | 000000001 |
|     CLIENT PROCESS ID | 4438 |
|     CLIENT THREAD ID | 47470217350064 |
|     SESSION ID | 102367598 |
|     REQUEST DATA TRANSMISSION TIME | 2013.8.19 15:32.32.225 |
|     RESULT DATA TRANSMISSION TIME | 2013.8.19 15:32.32.236 |
|     RESULT DATA NUMBER | 00000123 |
|     RESULT DATA STATE | 0 |
|     RESULT DATA LENGTH | 4 |
|     PROCESSING RESULT | COLUMN1=4 |

RESULT DATA

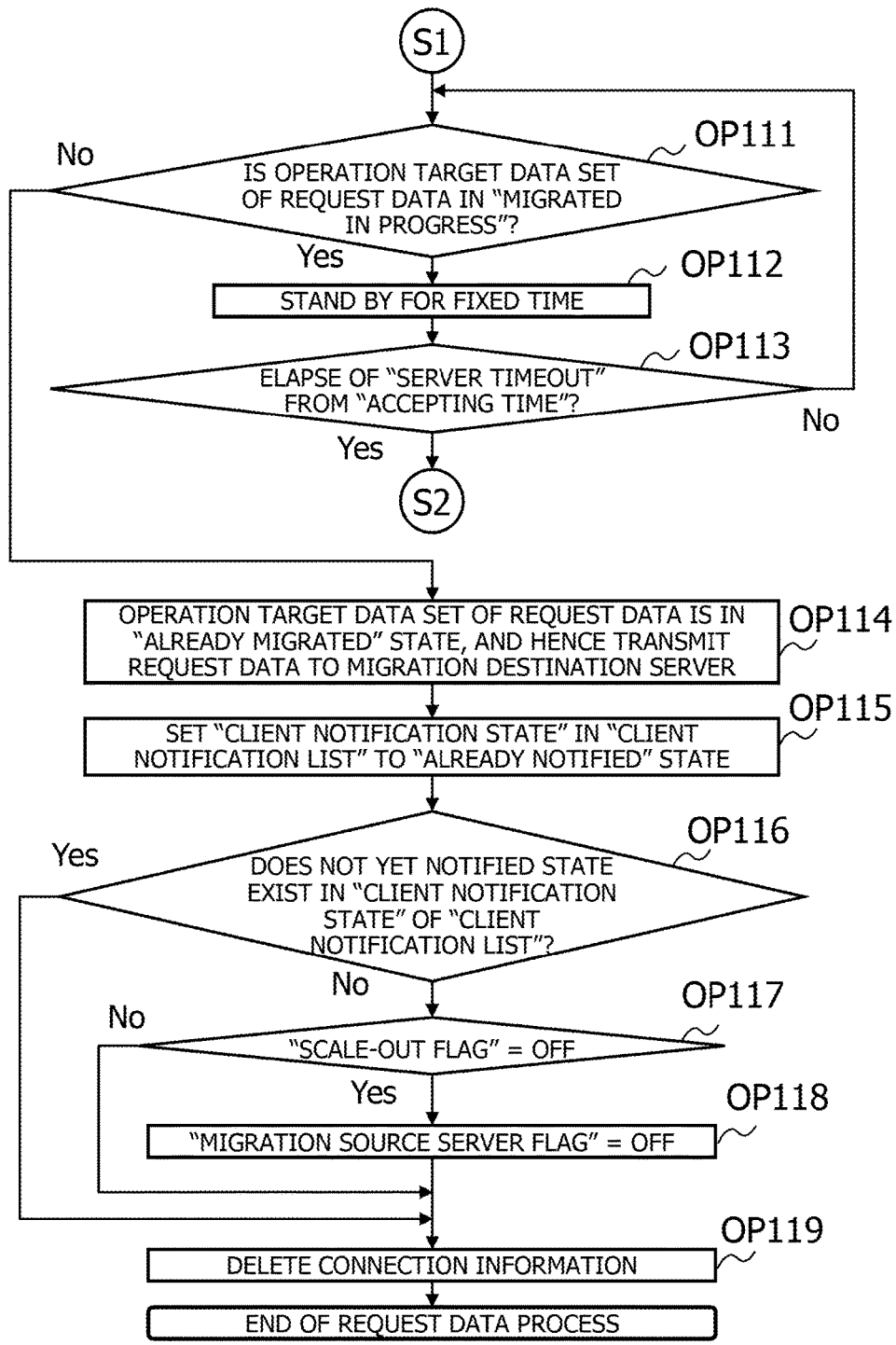

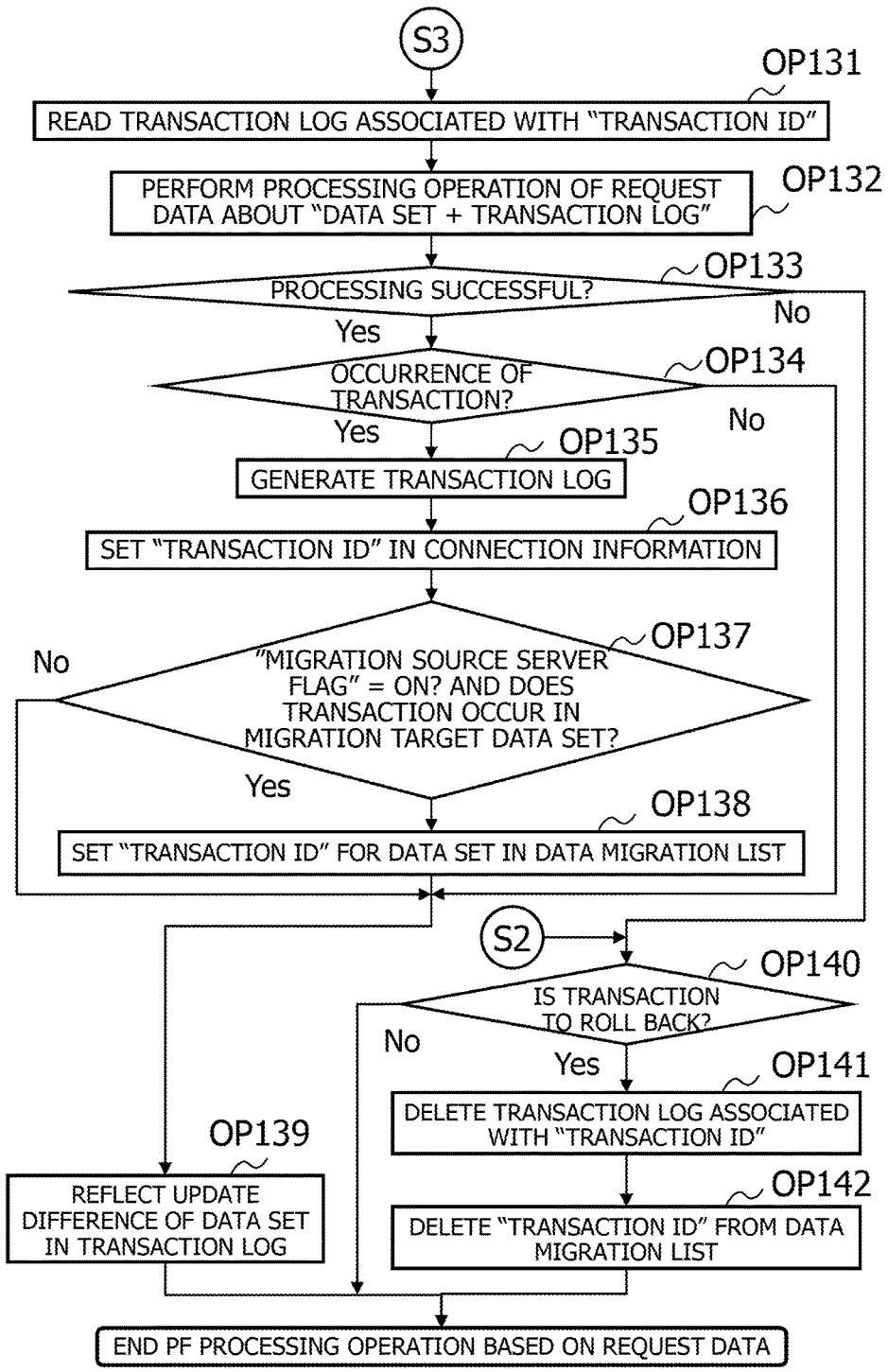

DATA MIGRATION APPARATUS AND SYSTEM

CROSS-REFERENCE TO RELATED APPLICATION

This application is based upon and claims the benefit of priority of the prior Japanese Patent Application No. 2015-023203, filed on Feb. 9, 2015, the entire contents of which are incorporated herein by reference.

FIELD

The embodiments discussed herein are related to a data migration apparatus and a data migration system.

BACKGROUND

Over the recent years, with an increase in data quantity treated by an enterprise, a large scale of an online system and an introduction of cloud computing have been accelerated. Key-Value Store (KVS) is one of techniques for processing data fast. The KVS is a technique for saving and managing the data. The KVS is configured to manage the data as a pair of data (Value) desired to be saved and a unique identifier (Key) associated therewith. The KVS acquires the data with a mechanism as simple as fetching Value by designating Key in response to a processing request given from a client in the online system and other equivalent systems. The data can be saved in distribution to a plurality of servers corresponding to Keys, and therefore the servers are easy to be extended. In other words, the KVS exhibits excellent extensibility and reduces a delay of processing time. Speed-up of the processing is facilitated by extending the servers. Note that a scheme for expanding a system scale by extending the servers is said to be "Scale Out".

A distributed KVS (DKVS) configured to save the data by distributing the data to a plurality of servers is suited to a stateless processing method, and is easy to attain the scale-out. The stateless processing method is a method of determining output data with respect to input data without retaining data indicating a present state and other equivalent states.

On the other hand, a task service and other equivalent services by the online system are generally hard to be attained by only the stateless processing method, and particularly an important task service adopts a stateful processing method. The stateful processing method is a method of retaining the data indicating the present state and other equivalent data, and determining the output data by reflecting a content of the retained data in the input data. When adding functions instanced by a transaction, exclusive control, assurance of reading consistency and a countermeasure against split-brain syndrome in a Relational Database Management System (RDBMS) and other equivalent systems to the stateless extensible distributed KVS, there is no alternative but to manage the states, and the processing method results in being stateful with no extensibility.

When increasingly flexible to the transaction, the exclusive control, the assurance of reading consistency and the countermeasure against split-brain syndrome with respect to the task service of the distributed KVS and other equivalent services, a stateless property is lost, and the processing method results in being stateful with no extensibility. Accordingly, the service does not become eligible as the task service of the distributed KVS, and hence the extensibility is lost.

PATENT DOCUMENTS

[Patent Document 1] Japanese Laid-Open Patent Publication No. 2013-175117
[Patent Document 2] Japanese Laid-Open Patent Publication No. 2007-328711
[Patent Document 3] Japanese Laid-Open Patent Publication No. 2005-339079

SUMMARY

According to one aspect of the present invention, an information processing apparatus accepts migration of data from a migration source information processing apparatus. The information processing apparatus includes a processor to execute an operation for operation target data as a target of a processing request given from a client apparatus when the operation target data is migrated from the migration source information processing apparatus and the processing request is received from the migration source information processing apparatus, and to notify the client apparatus of a processing result of the operation, the result containing arrangement information of the operation target data.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 9A is a diagram illustrating an example of a table definition of RDBMS;
FIG. 9B is a diagram illustrating an example of a table definition of KVS;
FIG. 9C is a diagram illustrating an example of an arrangement definition of a data set;
FIG. 10 is a diagram illustrating one example of a data structure of a data migration list;
FIG. 11 is a diagram illustrating one example of a data structure of a migrated data list;
FIG. 12 is a diagram illustrating one example of a data structure of a client notification list;
FIG. 13 is a diagram illustrating one example of a data structure of a connection information list;
FIG. 14 is a diagram illustrating one example of a data structure of a transaction log;
FIG. 15 is a diagram illustrating one example of a data structure of migration data;

FIG. 16 is a diagram illustrating an example of a definition file of a server apparatus;

FIG. 17 is a diagram illustrating one example of a data structure of a data set connecting destination list in a client apparatus;

FIG. 18 is a diagram illustrating one example of a data structure of a server connecting destination list in the client apparatus;

FIG. 19 is a diagram illustrating an example of a definition file of the client apparatus;

FIG. 20 is a diagram illustrating one example of a data structure of request data;

FIG. 21 is a diagram illustrating one example of a data structure of result data;

FIG. 36B is a flowchart, given as one example, of the request data process;

FIG. 37B is a flowchart, given as one example, of the processing operation based on the request data;

DESCRIPTION OF EMBODIMENTS

When scaling out the servers executing the stateful process, data mismatching occurs as the case may be. For example, after the data was migrated to the extended migration destination server, the data of the migration source server is updated in response to the processing request given from the client, in which case a difference may occur between the data of the migration destination server and the data of the migration source server.

Further, a data arrangement on the server side is changed due to an extended server, and is mismatched with a data arrangement retained on the client side as the case may be.

It follows that the client stops the processing request given to the server and reconnects to the extended server after the scale-out in order to prevent the data mismatching. To be specific, when executing the stateful process for the task service and other equivalent services, the data is migrated after stopping the task service and restricting an access to the data, with the result that the scale-out is not easy to be attained and advantages of the stateless property owing to the distributed KVS is not exploited.

An embodiment of the present invention will hereinafter be described based on the drawings. A configuration of the following embodiment is an exemplification, and the present invention is not limited to the configuration of the embodiment.

<Shared Nothing System>

Figure 1:
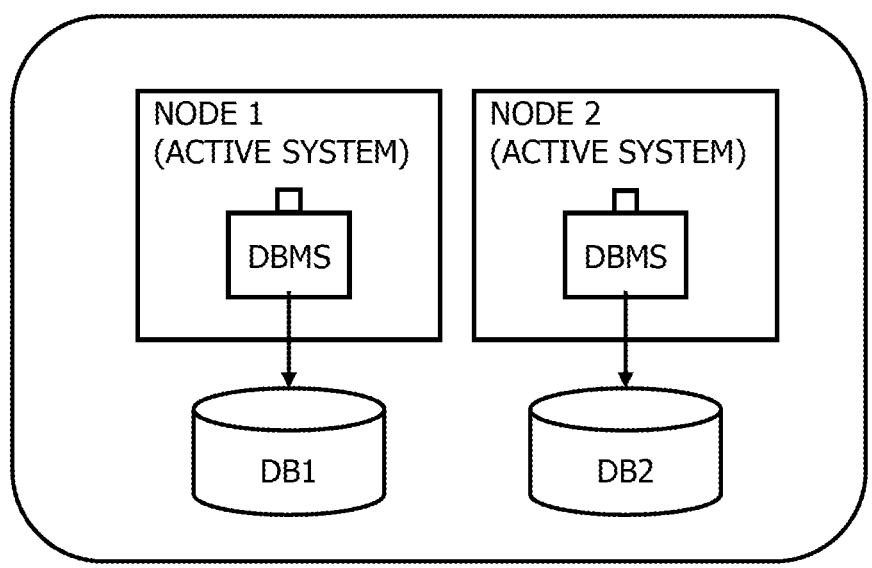
FIG. 1 is a diagram illustrating an example of an information processing system based on a Shared Nothing system.

FIG. 1 is a diagram illustrating an example of an information processing system based on a shared nothing system. The Shared Nothing system is a system to associate a server with management of access to a database. The information processing system in FIG. 1 includes nodes 1 and 2. The node 1 in an active system manages a database DB1 through a Database Management System (DBMS). The node 1 directly accesses the database DB1 to perform exclusive control within the node 1. The node 2 in the active system manages a database DB2 through the DBMS. The node 2 directly accesses the database DB2 to perform the exclusive control within the node 2. The node 1, when accessing the database DB2, indirectly accesses the database DB2 by issuing a processing request to the node 2.

The Shared Nothing system has an advantage of eliminating a necessity for the exclusive control between or among computers configuring the information processing system. The Shared Nothing system enables utilization of a database buffer in a memory similarly to a single system, the database buffer having an influence on performance of the database system. The information processing system based on the Shared Nothing system can therefore efficiently execute an Input/Output (I/O) process, and can assure performance scalability proportional to a number of servers.

<Comparative Example 1>

Figure 2:
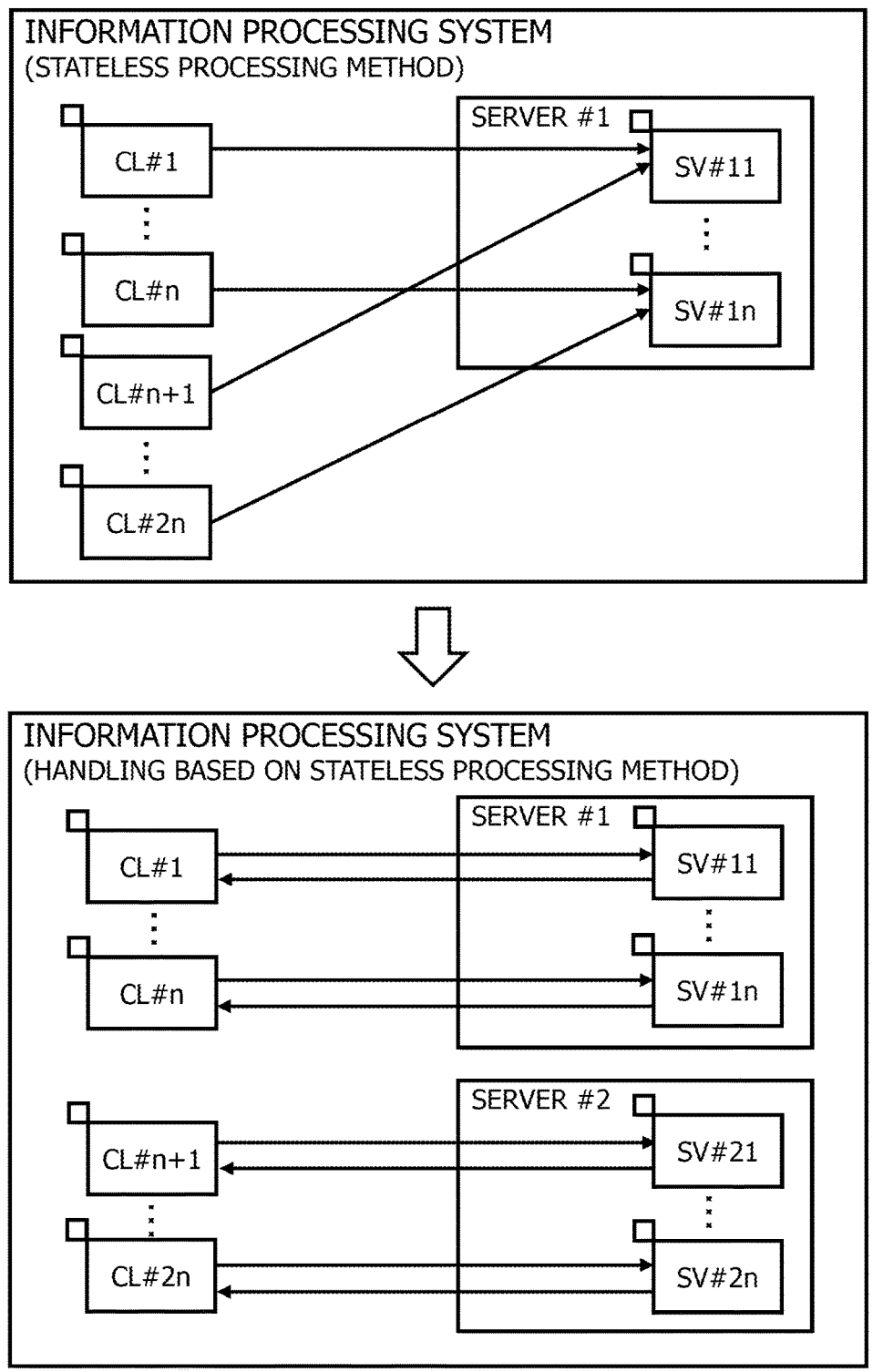
FIG. 2 is a diagram illustrating an example of scale-out in a comparative example 1.

FIG. 2 is a diagram illustrating an example of scale-out in a comparative example 1. In FIG. 2, the information processing system operated based on a stateless processing method includes a plurality of client devices (which will hereinafter be also simply termed clients) CL#1 through CL#2n. The information processing system further includes a server device (which will hereinafter be also simply termed a server), i.e., a server #1. The server #1 includes a plurality of nodes SV#11 through SV#1n. The information processing system is operated based on the stateless processing method, and therefore determines output data with respect to input data without retaining any state and data (which will hereinafter be also termed state data) or other equivalent information within a control system.

In FIG. 2, the clients CL#1-CL#n request the nodes SV#11-SV#1n to execute the processes. When the clients CL#n+1-CL#2n request the nodes SV#11-SV#1n to execute the processes, a quantity of processing requests to the server

1 is doubled. The server #2 is added to handle an increase of processing requests. The server #2 includes a plurality of nodes SV#21-SV#2n. The information processing system is operated based on the stateless processing method and therefore does not migrate the state data to the added server #2. Hence, connecting destinations of the processing requests of clients CL#n+1-CL#2n are changed respectively to the nodes SV#21-SV#2n, thereby enabling scale-out and doubling a throughput of the server side.

<Comparative Example 2>

Figure 3:
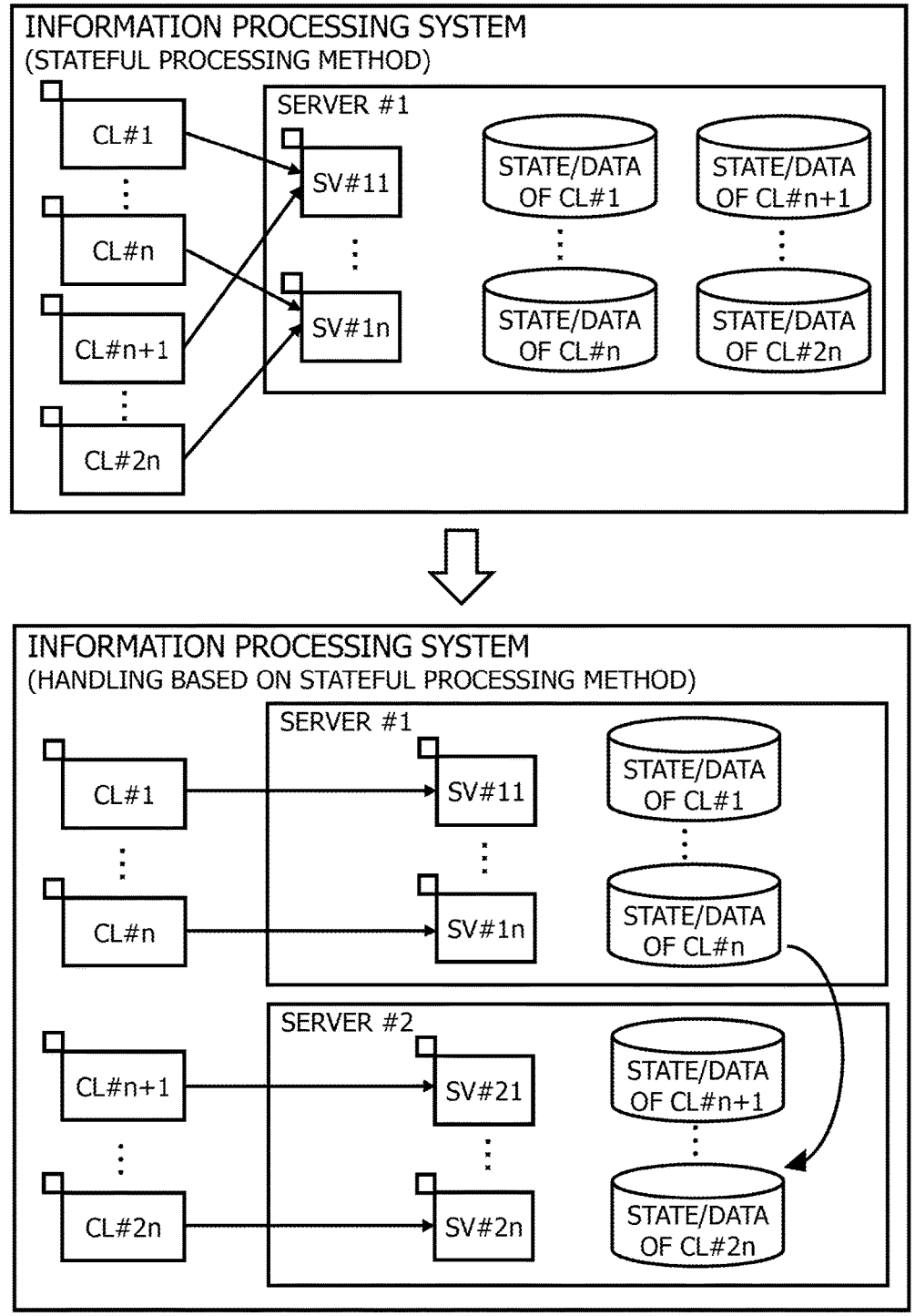
FIG. 3 is a diagram illustrating an example of the scale-out in a comparative example 2.

FIG. 3 is a diagram illustrating an example of the scale-out in a comparative example 2. The information processing system operated based on a stateful processing method includes clients CL#1-CL#2n as a plurality of clients. The information processing system further includes server #1 as a server. The server #1 includes the plurality of nodes SV#1-SV#1n. The server #1 retains the state data of the clients CL#-CL#2n. The information processing system, which is operated based on the stateful processing method, therefore retains the state data about the processing requests given from the clients within a control system, and determines the output data while reflecting retained contents in the input data.

In FIG. 3, the clients CL#1-CL#n request the nodes SV#11-SV#1n to execute the processes. When the clients CL#n+1-CL#2n request the nodes SV#11-SV#1n to execute the processes, a quantity of processing requests to the server #1 is doubled. The server #2 is added to handle the increase of processing requests. Here at, in the information processing system, the state data are also migrated to the server #2.

Concretely, when the server #2 is added, at first, an access to the state data from the client is stopped, a transaction being currently processed is discarded. Next, the state data of the clients CL#n+1-CL#n are migrated to the server #2. The clients do not transmit the processing requests till the migration of the state data is completed. The clients CL#n+1-CL#n change the connecting destinations of the processing requests to the added server #2. After completing the migration of the state data, the clients transmit the processing request of the discarded transaction to the server #2. This transaction is executed from the beginning.

<Comparative Example 3>

Figure 4:
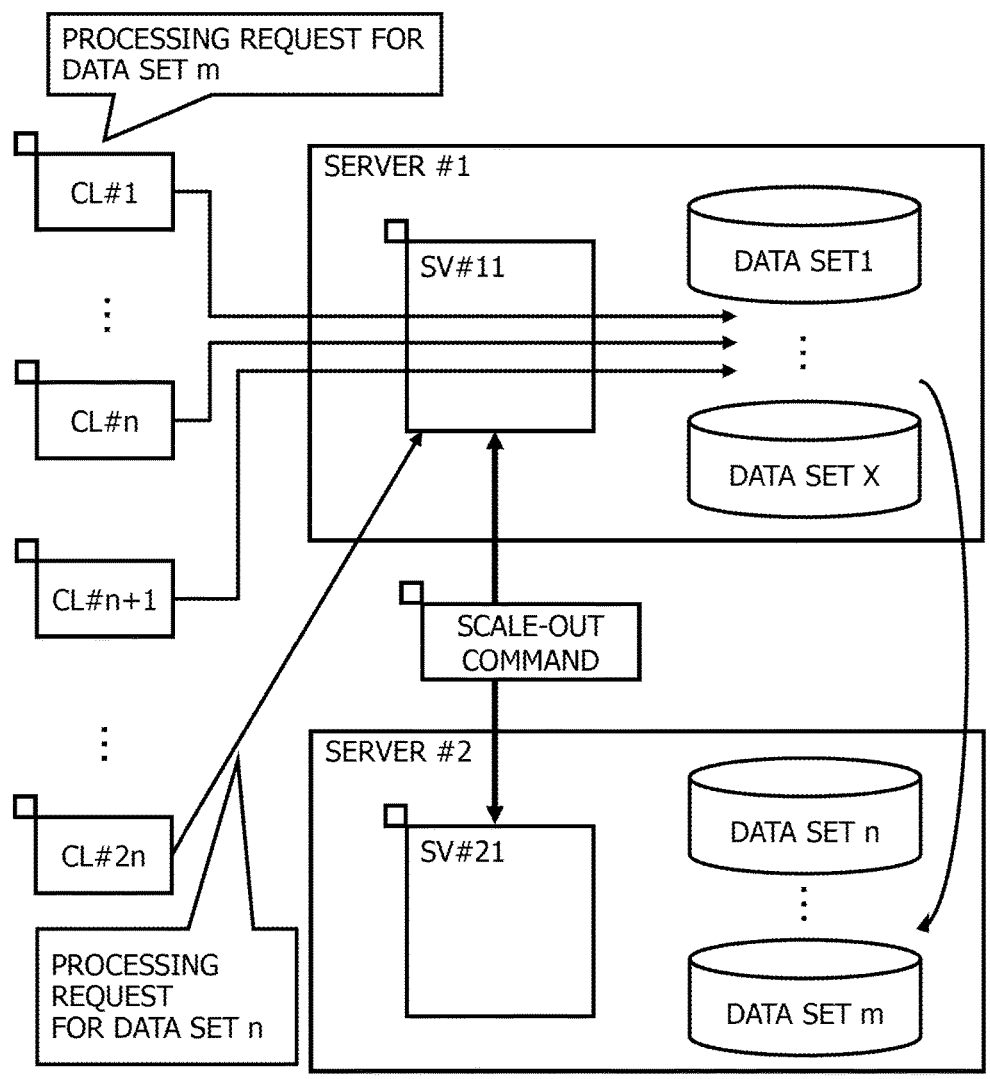
FIG. 4 is a diagram illustrating an example of the scale-out in a comparative example 3.

FIG. 4 is a diagram illustrating an example of the scale-out in a comparative example 3. In FIG. 4, the information processing system includes clients CL#1-CL#n as the plurality of clients. The information processing system further includes the server #1 and the server #2 as the servers. The server #1 includes the node SV#11, and contains a data set 1 through a data set X. The server #2 includes the node SV#21. The server #2 contains a data set n through a data set m, which have been migrated from the server #1.

In FIG. 4, the clients CL#1-CL#2n access the data sets of the server #1. Upon the migration of the data set being currently updated to the server #2, a difference occurs between the data set of the server #1 and the data set of the server #2. When the data set has been migrated to the server #2, the clients are unable to access the data set migrated to the server #2 because of the connecting destinations not being changed unless updating data arrangement information in the servers #1 and #2, the information being retained on the side of clients.

When scaling out the servers operating based on the Shared Nothing system or the stateful processing method, the data accesses to the servers from the clients are stopped in order to prevent the difference from occurring between the data of the migration source data and the migration destination server. The stop of the data accesses to the servers from the clients enables the clients to add information on the connecting destination of a new server and to change the arrangement and other equivalent operations of the data retained by the clients. Consistency of the data arrangement between the client and the server is thereby maintained.

<Embodiment>

An expansion of the throughput in the information processing system entails an extension of the new server by the scale-out. A scale-out target server (which will hereinafter be also termed a migration source server) migrates a part of data retained by the self server to the extended server (which will hereinafter be also termed a migration destination server).

When performing the scale-out in the information processing system operated based on the Shared Nothing system or the stateful processing method, the migration destination server takes over a transaction state and a connection state in addition to the data retained so far by the migration source server from the migration destination server. The information processing system is thereby enabled to continue a transaction process without stopping the data access to the server from the client.

The client transmits data for a processing request (which will hereinafter be also termed request data or a processing request) to the server containing an operation target data set. Note that the data to be arranged on the server are managed on a set-by set basis of the data. The server having received the request data and executed a process based on the request data transmits data containing a processing result (which will hereinafter be also termed result data) to the client. The client, when a transmission destination server of the request data is different from a reply source server of the result data, recognizes that an arrangement destination of the data set has been changed. Upon recognizing that the arrangement destination of the data set has been changed, the client changes the information on the connecting destination of the server on which the data sets are arranged, the information being retained on the client side. The client is thereby enabled to dynamically change the management information about the arrangement and other equivalent operations of the data set.

Accordingly, the information processing system enables the scale-out currently conducted online by dynamically changing the management information of the client without stopping the data access to the server from the client. The server is one example of an information processing apparatus. The migration destination server is one example of a migration destination information processing apparatus. The migration source server is one example of a migration source information processing apparatus. The request data is one example of a processing request. The data set defined as the operation target of the request data is one example of operation target data.

<Configuration of Apparatus>

Figure 5:
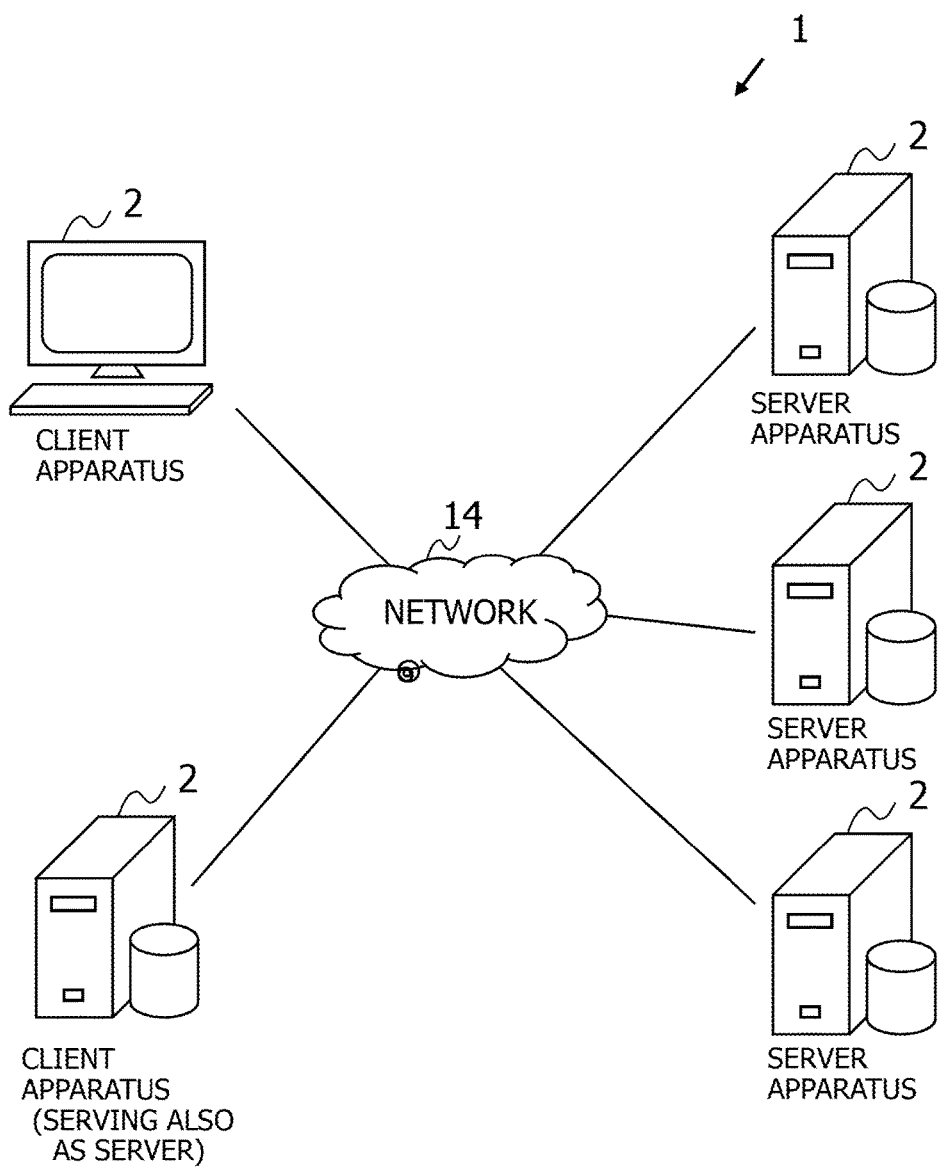
FIG. 5 is a diagram illustrating one example of the information processing system.
Figure 6:
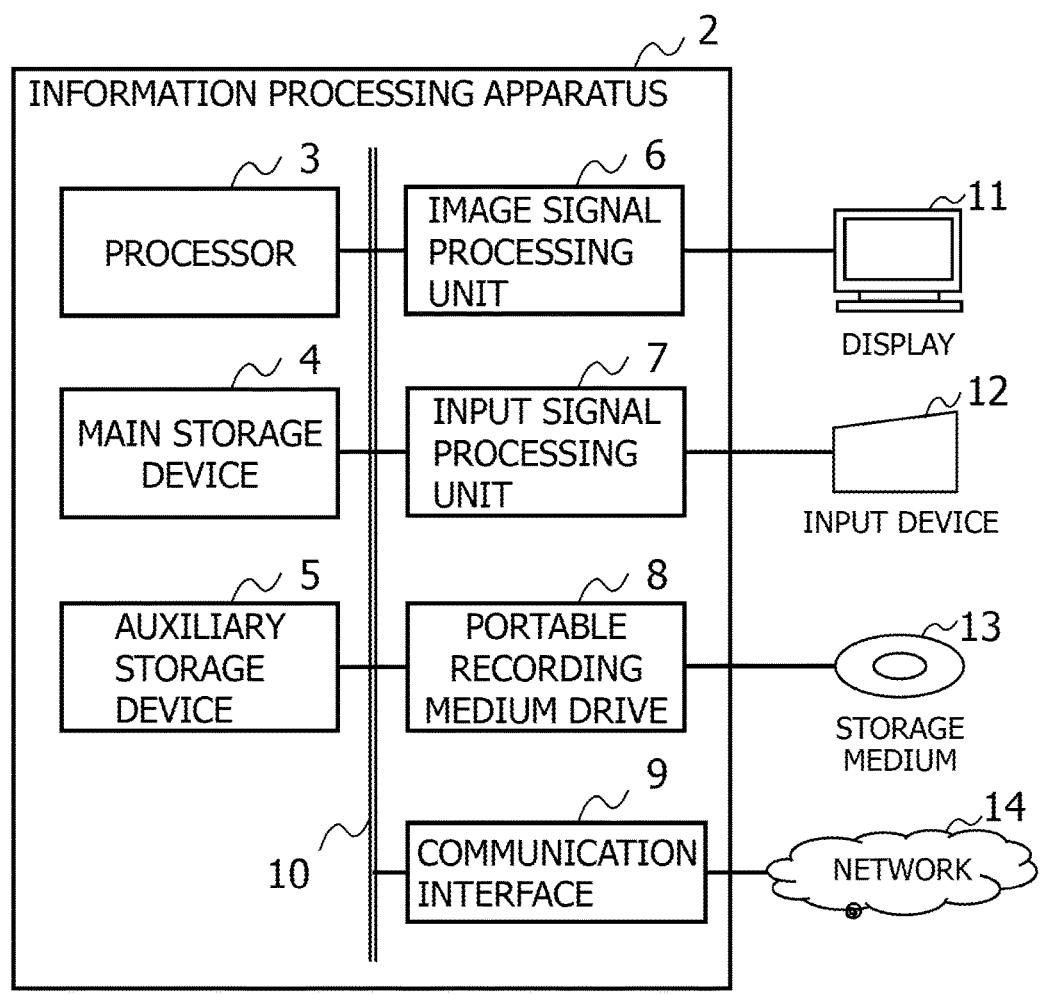
FIG. 6 is a diagram illustrating one example of a hardware configuration of an information processing apparatus.

FIGS. 5 and 6 demonstrate one example of a configuration of an apparatus in the embodiment. FIG. 5 is a diagram illustrating one example of the information processing system 1. The information processing system 1 includes a plurality of information processing apparatuses 2 interconnected via a network 14. The information processing apparatus 2 may also be a client apparatus, a server apparatus or a server/client apparatus.

FIG. 6 is a diagram illustrating one example of a hardware configuration of the information processing apparatus 2. The information processing apparatus 2 includes a processor 3, a main storage device 4, an auxiliary storage device 5, an image signal processing unit 6, an input signal processing unit 7, a portable recording medium drive 8, and a communication interface 9. These components are interconnected via a bus 10.

The processor 3 executes a variety of processes by loading, on the main storage device 4, OS and various categories of computer programs retained on the auxiliary storage device 5 or a storage medium 13 and running these software components. However, a part of processes by the computer programs may also be executed by hardware circuits. The processor 3 is exemplified by a Central Processing Unit (CPU) and a Digital Signal Processor (DSP).

The main storage device 4 provides a storage area for loading the programs stored in the auxiliary storage device 5 and an operation area for executing the programs. The main storage device 4 is used as a buffer for retaining the data. The main storage device 4 is exemplified by a semiconductor memory instanced by a Read Only Memory (ROM), a Random Access Memory (RAM) and other equivalent storages. The main storage device 4 is one example of "a memory".

The auxiliary storage device 5 stores the various categories of programs and data used for the processor 3 to execute the programs. The auxiliary storage device 5 is exemplified by a nonvolatile memory instanced by an Erasable Programmable ROM (EPROM) or a Hard Disk Drive (HDD) and other equivalent storages. The auxiliary storage device 5 retains, e.g., the OS (Operating System) and a variety of other application programs.

The image signal processing unit 6 converts a processing result of the processor 3 into an image signal, and outputs the image signal to, e.g., a display 11. The input signal processing unit 7 outputs an input signal inputted from an input device 12 to the processor 3. The input device 12 is exemplified by a keyboard and a pointing device instanced by a mouse and other equivalent devices.

The portable recording medium drive 8 reads the programs and various items of data recorded on a storage medium 13. The storage medium 13 is a recording medium instanced by an SD (Secure Digital) card, a mini SD card, a micro SD card, a USB (Universal Serial Bus) flash memory, a CD (Compact Disc), a DVD (Digital Versatile Disc), a flash memory card, and other equivalent mediums.

The communication interface 9 is an interface for inputting and outputting the information from and to the network 14. The communication interface 9 includes an interface for establishing a connection to a cable network, and an interface for establishing a connection to a wireless network. The communication interface 9 is instanced by a NIC (Network Interface Card), a wireless LAN (Local Area Network) card, and other equivalent interfaces. The data and other equivalent information received by the communication interface 9 are output to the processor 3.

In the information processing apparatus 2, the processor 3 loads a control program retained on the auxiliary storage device 5 into the main storage device 4, and executes the control program. Note that the configuration of the information processing apparatus 2 is one example, and the components thereof can be properly omitted, replaced and added corresponding to the embodiment without being limited to the configuration described above. The control program may be recorded on, e.g., the storage medium 13.

<Processing Configuration>

Figure 7:
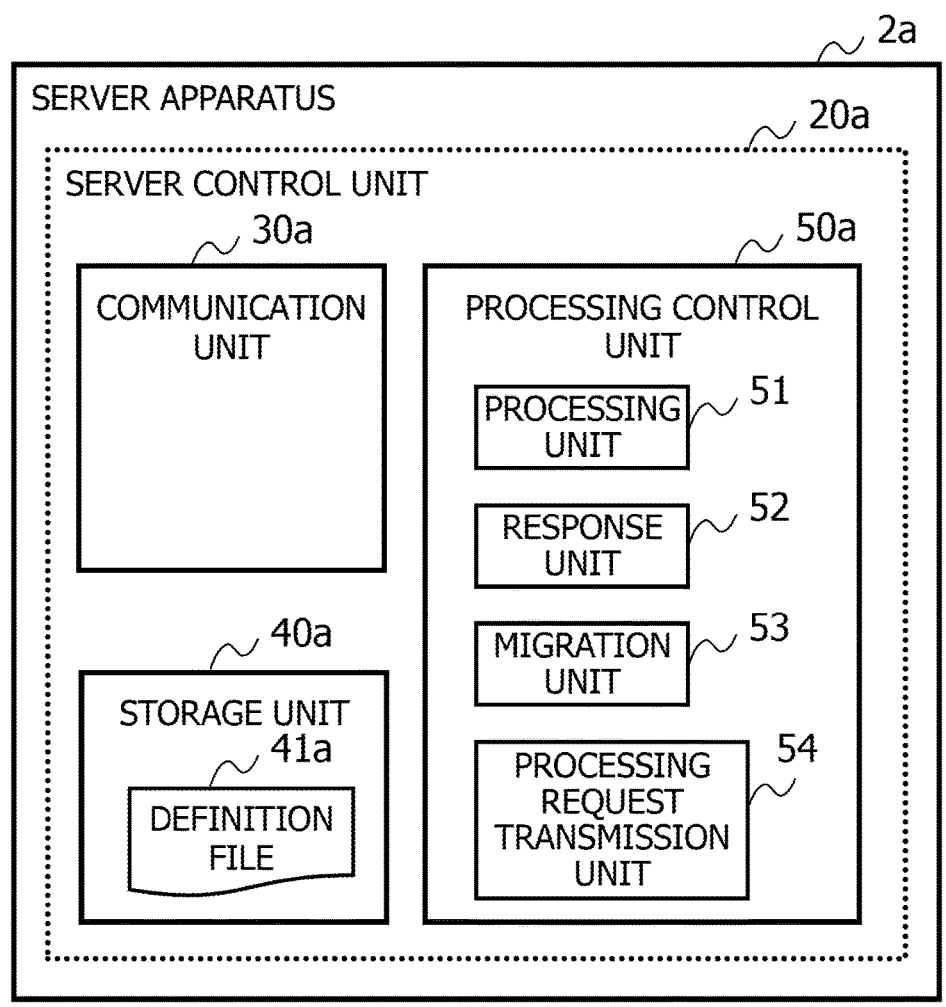
FIG. 7 is a diagram illustrating one example of a processing configuration of a server apparatus.
Figure 8:
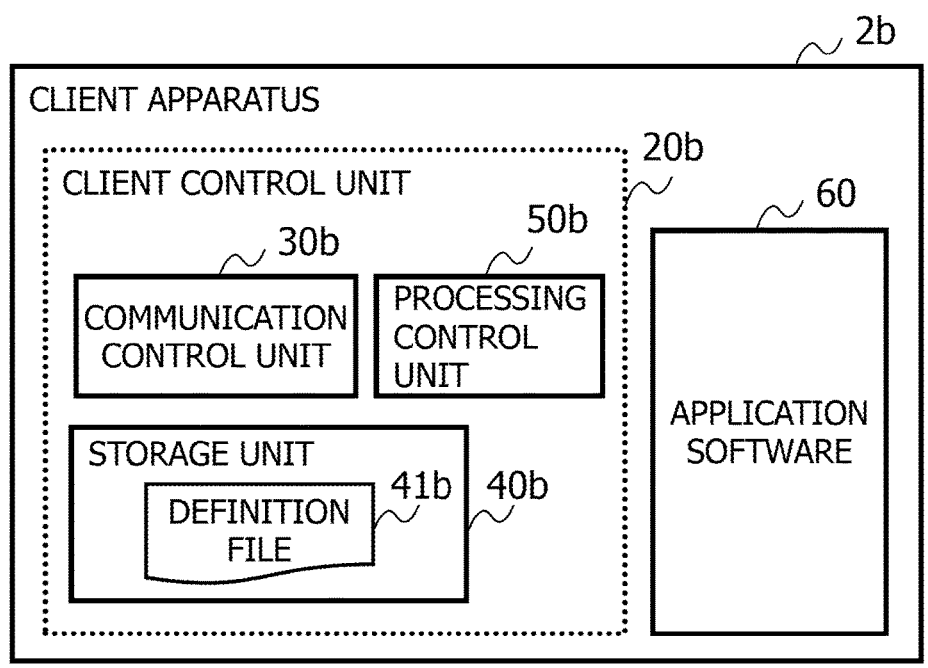
FIG. 8 is a diagram illustrating one example of a processing configuration of a client apparatus.

FIGS. 7 and 8 demonstrate a processing configuration of the information processing apparatus 2. FIG. 7 is a diagram illustrating one example of a processing configuration of a server apparatus 2a. The server apparatus 2a is one example of the information processing apparatus 2. The server apparatus 2a includes a server control unit 20a. The server control unit 20a includes a communication control unit 30a, a storage unit 40a and a processing control unit 50a.

The communication control unit 30a controls communications with other information processing apparatuses 2 within the information processing system 1. The storage unit 40a contains a definition file 41a. The definition file 41a registers values of definition parameters on the side of the server, the parameter values being used for the processing by the processing control unit 50a.

The processing control unit 50a includes a processing unit 51, a response unit 52, a migration unit 53, and a processing request transmission unit 54. The processing unit 51 receives the request data from the client, and carries out a process based on the request data. The response unit 52 notifies the client of the processing result containing the arrangement information of the data set. The migration unit 53 migrates a migration target data set to the migration destination server from the migration source server. The migration unit 53 migrates differential data, containing updated contents in the migration source server, of the data set being currently updated, to the migration destination server together with the data set. The processing request transmission unit 54 transmits the request data received from the client to the migration destination server.

The processor 3 of the server apparatus 2a executes, based on the computer programs, processes of the communication control unit 30a, the storage unit 40a, the processing control unit 50a, the processing unit 51, the response unit 52, the migration unit 53 and the processing request transmission unit 54. However, the hardware circuits may implement anyone of the communication control unit 30a, the storage unit 40a, the processing control unit 50a, the processing unit 51, the response unit 52, the migration unit 53 and the processing request transmission unit 54, or may execute a part of the processes thereof.

FIG. 8 is a diagram illustrating one example of a processing configuration of the client apparatus 2b. The client apparatus 2b is one example of the information processing apparatus 2. The client apparatus 2b includes a client control unit 20b and application software 60. The client control unit 20b includes a communication control unit 30b, a storage unit 40b and a processing control unit 50b.

The communication control unit 30b controls the communications with other information processing apparatuses 2 within the information processing system 1 via the network 14. The storage unit 40b contains a definition file 41b. The definition file 41b registers values of definition parameters on the side of the client, the parameter values being used for the processing by the processing control unit 50b. The processing control unit 50b changes client-sided management information about the arrangement and other equivalent operations of the data set. The application software 60 is an application that is executed by the client apparatus 2b. Occurrence of the processing request given to the server apparatus 2a from the client apparatus 2b is triggered by executing the application software 60. The client apparatus 2b transmits the request data containing contents of the processing request to the server apparatus 2a.

The processor 3 of the client apparatus 2b executes, based on the computer programs, processes of the communication control unit 30b, the storage unit 40b and the processing control unit 50b. However, the hardware circuits may implement any one of the communication control unit 30b, the storage unit 40b and the processing control unit 50b, or may execute a part of the processes thereof.

<Data Structure>

FIGS. 9A through 16 demonstrate examples of definitions and data structures, which are used in the server apparatus 2a. FIGS. 17 through 19 demonstrate examples of definitions and data structures, which are used in the client apparatus 2b. FIGS. 20 and 21 demonstrate data structures of the data transmitted and received between the server apparatus 2a and the client apparatus 2b.

FIG. 9A is a diagram illustrating an example of a table definition of an RDBMS (Relational Database Management System). The table definition of the RDBMS is used for defining the arrangement of the data set. In FIG. 9A, the table definition of the RDBMS contains a "column name" field, a "type" field and a "setting value" field as one example. The table definition of the RDBMS may also be a table definition containing fields pursuant to SQL (Structured Query Language) rules.

The "column name" is a name of column in the RDBMS. Arbitrary character strings, e.g., "COLUMN1", "COLUMN2" are entered in the "column name" field. The "type" is a data type in the RDBMS. For example, "INTEGER" is entered in the "type" field as a type for the column of "COLUMN2". In other words, a value of the integer type is stored in the column of "COLUMN2". The "setting value" field is a value stored in a corresponding column. For example, a value within a range of "−32,768~+32,767" is stored in the column of "COLUMN2" as the "setting value". In other words, the value stored in the column of "COLUMN2" is an integer within a range of "−32,768~+32,767".

FIG. 9B is a diagram illustrating an example of a table definition of KVS. The KVS table definition is used for defining the arrangement of the data set. In FIG. 9B, the KVS table definition contains "KEY" field and "VALUE" field as one example. Each of "KEY" and "VALUE" fields further contains an "identifier" field, a "type name" field and a "setting value" field. The KVS table definition may also be a table definition containing an "index" field and other equivalent fields.

A unique key to be set for identifying the data desired to be saved is entered in the "KEY" field. For instance, "KEY1", "INTEGER" and "−32,768~+32,767" are entered respectively in the "identifier" field, the "type name" field and the "setting value" field of the "KEY" field. To be specific, the identifier "KEY1" takes a value of an integer with in a range of "−32,768~+32,767" as a key.

A value to be associated with "KEY" is entered in the "VALUE" field. For instance, "VALUE1", "CHAR" and "ABCDEFGHIJK" are entered respectively in the "identifier" field, the "type name" field and the "setting value" field of the "VALUE" field. To be specific, the identifier "VALUE1" takes a value of character strings corresponding to each of the key stored as "KEY1".

FIG. 9C is a diagram illustrating an example of a definition of the arrangement of the data set. The definition of the arrangement of the data set includes a definition of a range of the data contained in the data set and a definition of the server apparatus 2a in which the data set is arranged. In FIG. 9C, the arrangement of the data set is defined by a "data set name" field, a "column name or key name" field, a "value range" field and an "arrangement server" field as one example.

A name of the data set is entered in the "data set name" field. For example, "Partition01", "Partition02" and other equivalent names are entered in the "data set name" field. A name of the column or the key contained in the data set is entered in the "column name or key name" field. For instance, "COLUMN2" or "KEY1" is entered as the column name or the key name associated with the data set "Partition01". A value range of the column or the key is entered in the "value range" field. For example, "0~10000" is entered as the value range of the column name "COLUMN2" or the key name "KEY1" for the data set "Partition01". The server apparatus 2a with the data set being arranged therein is entered in the "arrangement server" field. For instance, "SV01" is entered as the server apparatus 2a with the data set "Partition01" being arranged. More specifically, the data set "Partition01" is a data set having the value range "0~10000" of the "COLUMN2" or "KEY1" and being arranged in the server "SV01".

FIG. 10 is a diagram illustrating one example of a data structure of a data migration list. The data migration list is a list of data set that is migrated to the migration destination server from the migration source server. The migration source server, upon receiving a scale-out instruction, generates the data migration list. The data migration list may be stored, e.g., in the main storage device 4. A migration target data set may be designated by changing the arrangement definition of the data set. The migration target data set may also be designated together with the scale-out instruction by a scale-out command.

The data migration list contains a "data set name" field, a "migration state" field and a "transaction ID" field. A name of the migration target data set is entered in the "data set name" field. A state of whether the data set is migrated to the migration destination server, is entered in the "migration state" field. For example, when not migrated, "0" indicating "not yet migrated" is entered in the "migration state" field. When the migration is in progress, "1" indicating "migration in progress" is entered therein. When the migration target data set has been already migrated, "2" indicating "already migrated" is entered therein. A transaction ID associated with the data set is entered in the "transaction ID" field. When the data set is currently updated, a value not being "0" is entered as the transaction ID in the "transaction ID" field.

In FIG. 10, a migration state of the data set "Partition01" is a "NOT YET MIGRATED (0)" state, and the transaction ID is "15896231". In other words, data set "Partition01" is not migrated to the migration destination server but is currently updated, and is therefore associated with the transaction ID is "15896231". A data set "Partition02" is currently migrated, while "Partition03" has already been migrated.

FIG. 11 is a diagram illustrating one example of a data structure of a migrated data list. The migrated data list is a list of the data sets to be migrated to the migration destination server from the migration source server. The migration destination server, upon receiving the scale-out instruction, generates the migrated data list. The migrated data list may be stored, e.g., in the main storage device 4. The migrated target data sets may be designated by changing the data set arrangement definition. The migrated target data sets may also be designated together with the scale-out instruction.

The migrated data list contains a "data set name" field, a "migrated state" field and a "transaction ID" field. The "data set name" field and the "transaction ID" field are the same as those of the data migration list, and hence their explanations are omitted. The "migrated state" field is also the same as the "migration state of the data migration list, and therefore its explanation is omitted.

In FIG. 11, the data set "Partition01" is not yet migrated, while "Partition02" is currently migrated. The data set "Partition03" has already been migrated, and the transaction ID is "15896239". In other words, the data set "Partition03", which has been migrated to the migration destination server, is currently updated and is therefore associated with the transaction ID "15896239".

FIG. 12 is a diagram illustrating one example of a data structure of a client notification list. The client notification list is a list compiled to manage whether each client apparatus 2b is notified that the migration target data set has been migrated to the migration destination server by the scale-out. Each client apparatus 2b can recognize, from result data received from the server apparatus 2a in response to the processing request for the server apparatus 2a, that the migration target data set has been migrated to the migration destination server. The server apparatus 2a may determine that the migration of the data set has been notified to the client apparatus 2b by transmitting the result data to the client apparatus 2b.

The client notification list contains data for the client apparatus 2b connected to the server apparatus 2a. The server apparatus 2a retains the data migration list till completion of notifying the migration of the data set to each of the client apparatuses 2b entered in the client notification list, and notifies the client apparatus 2b of the migration of the data set together with the transmission of the result data.

The client notification list contains a "client name" field and a "client notification state" field. A name to identify the client apparatus 2b connected to the server apparatus 2a is entered in the "client name" field. A state, about whether the migration of the data set is notified, is entered in the "client notification state" field. For example, when the migration of the data set is not notified, a value "0" indicating "not yet notified" is entered in the "client notification state" field. Whereas when the migration of the data set is already notified, a value "2" indicating "already notified" is entered therein.

In FIG. 12, the client notification state of the client apparatus 2b named "CLI01" is an "already notified (2)" state. To be specific, the server apparatus 2a has already notified the client "CLI01" of the migration of the data set. Similarly, the server apparatus 2a has already notified the client apparatus 2b named "CLI02" of the migration of the data set. While on the other hand, the server apparatus 2a does not yet notify the client apparatus 2b named "CLI03" of the migration of the data set.

FIG. 13 is a diagram illustrating one example of a data structure of a connection information list. The connection information list is a list of connection information with the client apparatuses 2b to be connected to the server apparatus 2a. The server apparatus 2a receives the processing request from the client apparatus 2b and, when a connection with this client apparatus 2b is not yet established, generates the connection information.

The connection information list contains a "connection count" field and a "connection information" field. A connection count, e.g., "1000", with the client apparatuses 2b is entered in the "connection count" field. The connection information is information on the connections with the client apparatuses 2, and is generated in quantity corresponding to the connection count.

The "connection information" field further contains a "connection ID" field, a "client name" field, a "client port number" field and a "transaction ID" field. A unique identifier, e.g., "102367598" allocated when establishing the connection is entered in the "connection ID" field. An IP (Internet Protocol) address or a machine name, e.g., "CLI01", or other equivalent information of the client apparatus 2b is entered in the "client name" field. A port number, e.g., "80" of the client apparatus 2b is entered in the "client port number" field. A transaction ID, e.g., "15896231" given when a transaction occurs is entered in the "transaction ID" field. Note that the server apparatus 2a may register the client apparatus 2b with the connection information being generated in the client notification list.

FIG. 14 is a diagram illustrating one example of a data structure of a transaction log. The transaction log contains attributes of an uncommitted transaction, operation targets, updated contents, and other equivalent information.

The transaction log contains a "transaction ID" field, a "connection ID" field, a "transaction state" field, a "transaction type" field, a "cursor state" field, a "table name" field, a "data set name" field, a "cursor position" field and an "update data" field.

A transaction ID, e.g., "15896231" given when a transaction occurs is entered in the "transaction ID" field. A unique identifier, e.g., "102367598" allocated when establishing the connection is entered in the "connection ID" field. A state of the transaction, e.g., "CONTINUE" is entered in the "transaction state" field. A type of the transaction, e.g., "ReadOnly" or "ReadWrite" is entered in the "transaction type" field. A state of the cursor, e.g., "OPEN" or "CLOSE" is entered in the "cursor state" field. A name of an operation target table, e.g., "TBL01" is entered in the "table name" field. A name of the operation target data set, e.g., "Partition01" is entered in the "data set name" field. Positional information of the cursor, e.g., "101" is entered in the "cursor position" field. A difference between the data before the transaction occurs and the data being currently updated "update data" field, and, e.g., "NONE" is entered when not updated. When currently updated, the post-change data may also be entered in the "update data" field. Further, when currently updated, a statement for handling the database, e.g., an SQL-based (Structured Query Language based) statement executed after the transaction has occurred may also be entered in the "update data" field.

FIG. 15 is a diagram illustrating one example of a data structure of migration data. The migration data contains contents of the data to be migrated to the migration destination server from the migration source server. When migration target data set is currently updated, the migration data contains contents of the transaction log.

The migration data contains a "data set name" field, a "data set data length" field, a "transaction ID" field, a "transaction log data length" field, a "data set actual data part" field and a "transaction log actual data part" field.

A name of the migration target data set, e.g., "Partition01" is entered in the "data set name" field. A data length of the migration target data set, e.g., "102400" is entered in the "data set data length" field. A transaction ID about the migration target data set is entered in the "transaction ID" field. For example, the transaction ID of the associated transaction log is entered in the "transaction ID" field when the transaction occurs with respect to the migration target data set, and "0" is entered therein when the transaction does not occur. A data length of the transaction log with respect to the migration target data set, e.g., "1024" is entered in the "transaction log data length" field. Actual data of the migration target data set is entered in the "data set actual data part" field. Actual data of the transaction log with respect to the migration target data set is entered in the "transaction log actual data part" field.

FIG. 16 is a diagram illustrating an example of a definition file 41a of the server apparatus 2a. The definition file 41a of the server apparatus 2a defines "CommunicationControlMultiplicity", "ServerTimeOut" and "ScaleoutTimeOut".

"CommunicationControlMultiplicity" is a multiplicity of communication control of the server apparatus 2a and is set to, e.g., "4". "ServerTimeOut" is a threshold value with which a period of time till the request data is returned since the request data has been received from the client apparatus 2b reaches time-out, and is set to, e.g., "3". "ScaleoutTimeOut" is a threshold value with which a period of time of a scale-out process reaches time-out, and is set to, e.g., "180".

FIG. 17 is a diagram illustrating one example of a data structure of a data set connecting destination list in the client apparatus 2b. The data set connecting destination list is a list of the data set as the operation target by the client apparatus 2b and connecting destination information of the data set.

The data set connecting destination list contains a "data set element count" field and a "combination of data set and connecting destination" field. A data set count, e.g., "5" set as the operation targets by the client apparatus 2b is entered in the "data set element count" field. Combinations of the data set and the connecting destination server with the data set being arranged are generated by the data set element count, and are entered in the "combination of data set and connecting destination" field.

The "combination of data set and connecting destination" field contains a "data set name" field and a "connecting destination server name" field. A name of the operation target data set is entered in the "data set name" field, and, for instance, "Partition00" is entered in the "data set name" field of the "combination 1 of data set and connecting destination" field. A name of the connecting destination server with the operation target data set being arranged is entered in the "connecting destination server name" field, and, for example, "SV01" is entered in the "connecting destination server name" field of the "combination 1 of data set and connecting destination" field.

FIG. 18 is a diagram illustrating one example of a data structure of a server connecting destination list in the client apparatus 2b. The server connecting destination list is a list of connecting destination information of the server apparatus 2a, which is accessed from the client apparatus 2b.

The server connecting destination list contains a "server connecting destination element count" field and a "server connecting destination information" field. A number of connecting destinations of the server apparatus 2a accessed from the client apparatuses 2b, e.g., "2" is entered in the "server connecting destination element count" field. The "server connecting destination information" fields are generated by the server connecting destination element count.

The "server connecting destination information" field contains a "server name" field and a "port number" field. An IP address or a machine name or other equivalent information of the server apparatus 2a to which the client apparatus 2b connects is entered in the "client name" field, and, for example, the machine name "SV01" is entered in the "server name" field of the "server connecting destination information 1" field. A port number of the server apparatus 2a to which the client apparatus 2b connects is entered in the "port number" field, and, for instance, "80" is entered in the "port number" field of the "server connecting destination information 1" field.

FIG. 19 is a diagram illustrating one example of a definition file 41b of the client apparatus 2b. The definition file 41b of the client apparatus 2b defines "ClientTimeOut", "ClientPort", "ServerName", "ServerPort" and "DataLocatedServer".

"ClientTimeOut" is a threshold value with which a period of time till the result data is returned since the request data has been transmitted reaches time-out, and is set to, e.g., "3".

"ClientPort" is a port number used in the client apparatus 2b and is set to, e.g., "80". "ServerName" is an IP address or a machine name or other equivalent information of the server apparatus 2a to which the client apparatus 2b connects, and, e.g., the machine name "SV01" is set as "ServerName". "ServerPort" is a port number of the server apparatus 2a to which the client apparatus 2b connects, and is set to, e.g., "80". "DataLocatedServer" is a combination of the data set name and the connecting destination server and is set such as "Partition00:SV01". Note that each of "ServerName", "ServerPort" and "DataLocatedServer" may have a plurality of definitions. In FIG. 19, in addition to the examples described above, "SV02", "80" and "Partition01: SV02" are set as "ServerName", "ServerPort" and "DataLocatedServer", respectively.

FIG. 20 is a diagram illustrating one example of a data structure of request data. The request data is data for the client apparatus 2b to request the server apparatus 2a including the operation target data set to execute the process. The request data contains a "server name" field, a "server port number" field, a "client ID" field, a "request data number" field, a "client name" field, a "client port number" field, a "client process ID" field, a "client thread ID" field, a "connection ID" field, a "request data transmission time" field, a "processing request type" field, a "processing request target" field, a "processing request input information" field and a "processing request output information" field.

An IP address or a machine name or other equivalent information of the server apparatus 2a to which the client apparatus 2b connects, e.g., IP address "101.23.11.501" is entered in the "server name" field. A port number of server apparatus 2a to which the client apparatus 2b connects, e.g., "80" is entered in the "server port number" field. An identifier of a client control program, e.g., "CL001" is entered in the "client ID" field. A unit number set by the client control program, e.g., "000000001" is entered in the "request data number" field. An IP address or a machine name or other equivalent information of the client apparatus 2b, e.g., the machine name "CLI001" is entered in the "client name" field. A port number used in the client apparatus 2b, e.g., "80" is entered in the "client port number" field. A process ID of a client application, e.g., "4438" is entered in the "client process ID" field. A thread ID of the client application, e.g., "47470217350064" is entered in the "client thread ID" field. An ID notified to the client apparatus 2b from the server apparatus 2a when establishing the connection, e.g., "102367598" is entered in the "connection ID" field. When requested to establish the connection from the client apparatus 2b, the server apparatus 2a generates the unique connection ID based on, e.g., "client name", "client port number", "client process ID", "client thread ID" and "request data transmission time". A timestamp when requested to execute the process from the client apparatus 2b, e.g., "2013.8.19 15:32.32.225" is entered in the "request data transmission time" field. A value to be entered in the "processing request type" field is an operation instruction pursuant to the SQL such as SELECT, INSERT, UPDATE, DELETE, or a function name in the client application. For example, "SELECT" is entered in the "processing request type" field. Resource information such as a DB name, a schema name, a table name or a partition, e.g., "TABLE1" is entered in the "processing request target" field. Input information for implementing the processing request is entered in the "processing request input information" field. To be specific, a value to be entered in the "processing request input information" field is exemplified by a search condition of a SELECT statement or a cursor name or other equivalent information in the SQL, or exemplified by an input parameter or a handle or other equivalent information in the client application. For instance, "WHERE COLUMN2=5" is entered in the "processing request input information" field. A target of an execution result of the processing request is entered in the "processing request output information" field. Specifically, a value to be entered in the "processing request output information" field is exemplified by the execution result of the SQL-based SELECT statement, or a target of an output result of the client application, e.g., a row name or a set function. For example, "COLUMN1" is entered in the "processing request output information" field.

FIG. 21 is a diagram illustrating one example of a data structure of result data. The result data is data used for the server apparatus 2a to notify a result of the process based on the request data to the client apparatus 2b having transmitted the request data. The result data contains a "client name" field, a "client port number" field, a "client ID" field, a "request destination server name" field, a "result transmission server name" field, and a "result data" field.

An IP address or a machine name or other equivalent information of the client apparatus 2b, e.g., IP address "101.23.11.501" is entered in the "client name" field. A port number used in the client apparatus 2b, e.g., "80" is entered in the "client port number" field. An identifier of the client control program, e.g., "CL001" is entered in the "client ID" field. An IP address or a machine name or other equivalent information of the request destination server apparatus 2a, e.g., IP address "101.24.12.101" is entered in the "request destination server name" field. An IP address or a machine name or other equivalent information of the result transmission server apparatus 2a, e.g., IP address "101.24.12.102" is entered in the "result transmission server name" field.

The "result data" field contains items of data related to the process based on the request data. The "result data" field contains a "request data number" field, a "client process ID" field, a "client thread ID" field, a "session ID" field, a "request data transmission time" field, a "result data transmission time" field, a "result data number" field, a "result data state" field, a "result data length" field, and a "processing result" field.

A number given when the client apparatus 2b makes the processing request, e.g., "000000001" is entered in the "request data number" field. A process ID of the client application, e.g., "4438" is entered in the "client process ID" field. A thread ID of the client application process, e.g., "47470217350064" is entered in the "client thread ID" field. An ID notified to the client apparatus 2b from the server apparatus 2a when establishing the connection, e.g., "102367598" is entered in the "session ID" field. The server apparatus 2a generates a unique session ID based on, e.g., "client name", "client port number", "client process ID", "client thread ID" and "request data transmission time". A timestamp when the processing request given from the client apparatus 2b, e.g., "2013.8.19 15:32:32.225" is entered in the "request data transmission time" field. A timestamp when the server apparatus 2a transmits the processing result, e.g., "2013.8.19 15:32:32.236" is entered in the "result data transmission time" field. A unique number for associating the "result data" with the processing result of the server apparatus 2a, e.g., "00000123" is entered in the "result data number" field. Information indicating whether the processing result is completed or is currently in continuation is entered in the "result data state" field, and, e.g., "0" is entered when completed, but "1" is entered when currently in continuation. A length of the result data, e.g., "4" is entered in the "result data length" field. A result of executing the processing request is entered in the "processing result" field. Concretely, the result of executing the SQL-based SELECT statement, i.e., an output result of the client application, e.g., a row name or a set function is entered in the "processing result" field. For example, "COLUMN1=4" is entered in the "processing result" field.

<Operational Example>

FIGS. 22 through 28 are explanatory diagrams of an operational example 1 through an operational example 7 in the embodiment. In FIGS. 22 through 28, a server #1 (a server #a1 in FIG. 28) is the migration source server as the scale-out target server. A server #2 (a server #a2 in FIG. 28) is the migration destination server. Note that a process of the server #1 (the server #a1 in FIG. 28) is described as being processed by a node SV#11 (a node SV#a11 in FIG. 28) in these drawings throughout, and, however, in each of the operational examples, this process is explained as the process of the server #1 (the server #a1 in FIG. 28). Similarly, a process of the server #2 is described as being processed by a node SV#21 (a node SV#a21 in FIG. 28), and, however, in each of the operational examples, this process is explained as the process of the server #2 (the server #a2 in FIG. 28).

<<Operational Example 1>>

The operational example 1 is an example of performing the scale-out while continuing a task without stopping the data access to the server from the client in the server operating based on the stateful method. The operational example 1 is also an example in which the operation target data set has already been migrated to the migration destination server when receiving the processing request from the client during the scale-out process.

Figure 22:
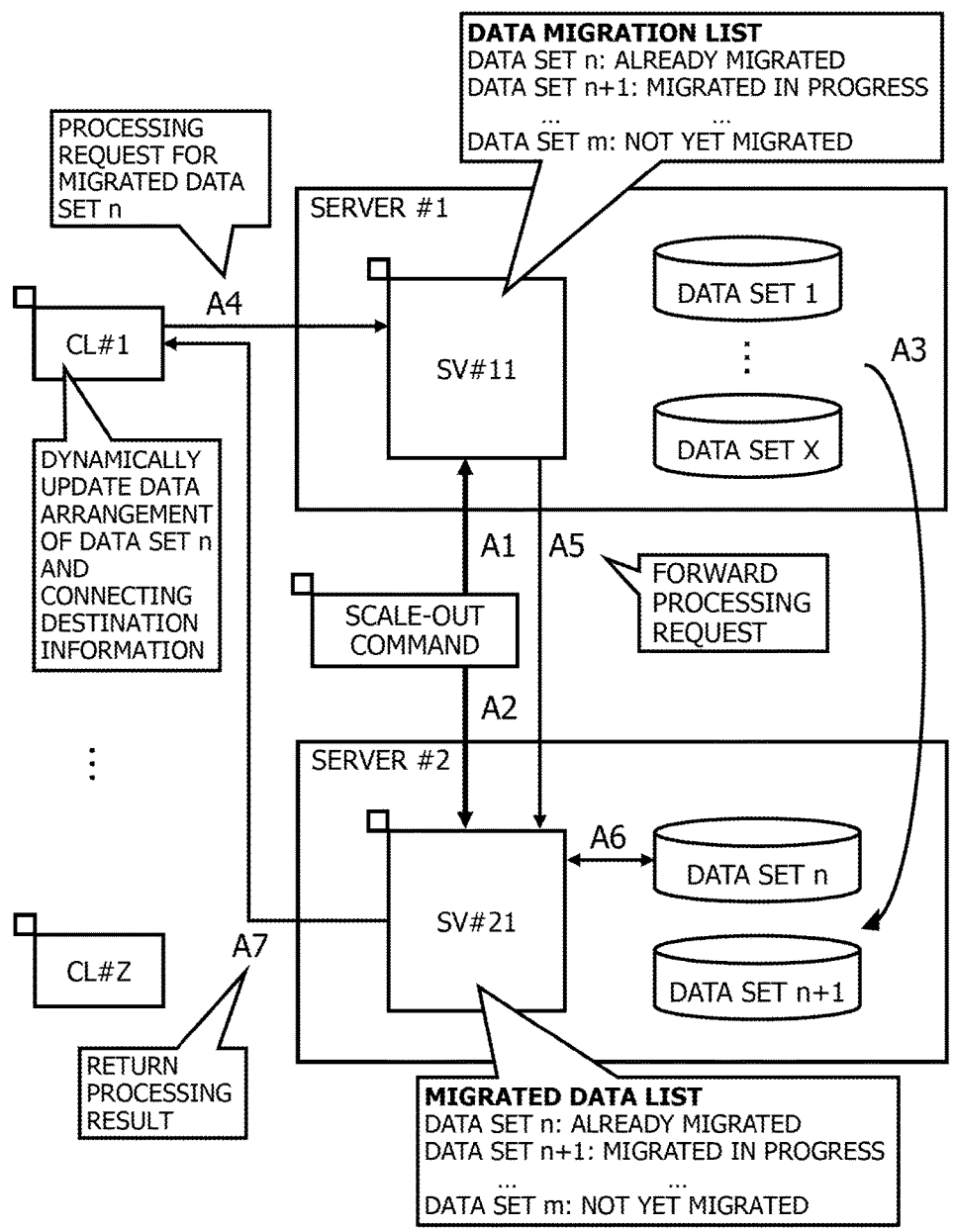
FIG. 22 is a diagram illustrating an operational example when receiving the processing request for the already-migrated data set.

FIG. 22 is a diagram illustrating an operational example when receiving the processing request for the already-migrated data set. When scaling out the server operating based on the stateful method, the scale-out command is issued to the servers #1 and #2 by a user's indication or a predetermined program or other equivalent triggers (A1, A2).

The server #1 having accepted the scale-out instruction by the scale-out command generates the data migration list illustrated in FIG. 10. In an example of FIG. 22, the migration target data sets are a data set n through a data set m. Similarly, the server #2 having accepted the scale-out instruction generates the migrated data list illustrated in FIG. 11. In the example of FIG. 22, the migrated target data sets are the data set n through the data set m.

Next, the server #1 migrates the data sets contained in the data migration list to the server #2 (A3). On the occasion of transmitting the migration target data sets, the server #1 updates the migration state of the data sets in the data migration list to a "migrated in progress" state from a "not yet migrated" state. The server #1, upon completing the migration of the data sets, updates the migration state of the data sets to an "already migrated" state from the "migrated in progress" state. In the example of FIG. 22, the state of the data set n is in the "already migrated" state, the data set n+1 is in the "migrated in progress" state, and the data set m is in "not yet migrated" state.

The server #2, upon a start of receiving the data sets from the server #1, updates the migrated state of the data sets to the "migrated in progress" state from the "not yet migrated" state. The server #2, upon completing the migration of the data sets, updates the migrated state of the data sets to the "already migrated" state from the "migrated in progress" state. In the example of FIG. 22, the data set n is in the "already migrated" state, the data set n+1 is in the "migrated in progress" state, and the data set m is in the "not yet migrated" state.

During the scale-out process, the server #1 accepts the processing request for the data set n from the client CL#1 (A4). The processing request is transmitted and received based on the data structure of the request data illustrated in FIG. 20. The server #1 refers to the data migration list, and thus determines the migration state of the operation target data set n related to the request data. The migration state of the data set n is the "already migrated" state, and hence the server #1 forwards the request data from the client CL#1 to the server #2 (A5).

The server #2 performs the operation for the data set n, based on the request data received from the server #1 (A6). After the operation for the data set n, the server #2 establishes the connection with the client CL#1, and returns the processing result to the client CL#1 (A7). The processing result is transmitted and received based on the data structure of the result data illustrated in FIG. 21.

The client CL#1 recognizes, from the result data being returned from the server #2 different from the server #1 as the processing requester, that the data set n has been migrated, and dynamically updates the data arrangement of the data set n retained by the client CL#1 and the connecting destination information of the processing request destination apparatus. To be specific, in the data set connecting destination list in FIG. 17, the "connecting destination server" with respect to the data set n is updated to the server #2.

<<Operational Example 2>>

An operational example 2 exemplifies an instance that the operation target data set is currently migrated to the migration destination server when receiving the processing request from the client during the scale-out process. In this case, the migration source server, after completing the migration of the data set to the migration destination server, transmits the processing request to the migration destination server.

Figure 23:
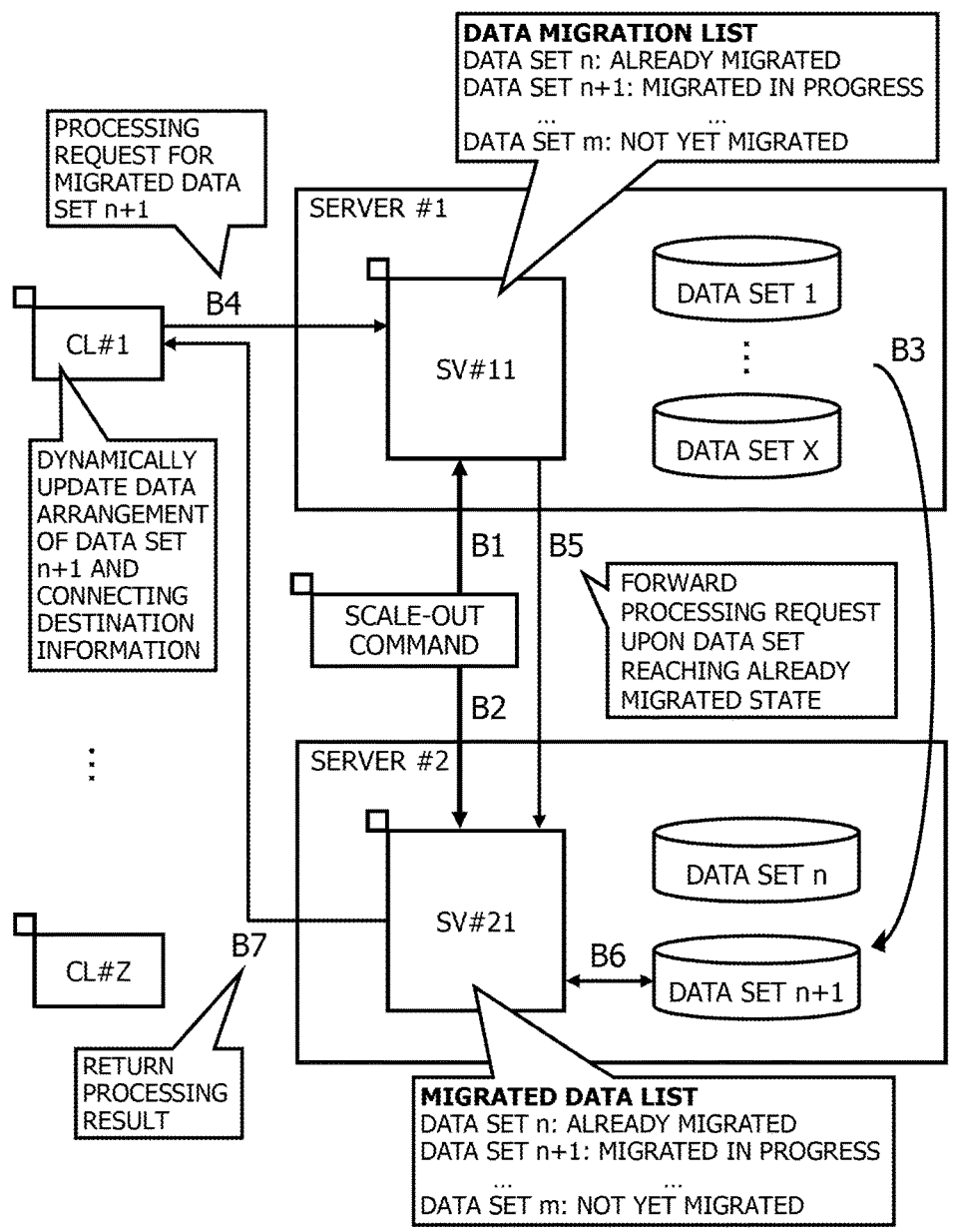
FIG. 23 is a diagram illustrating an operational example when receiving the processing request for the data set migrated in progress.

FIG. 23 is a diagram illustrating an operational example when receiving the processing request for the data set migrated in progress. Processes B1-B3 are the same as the processes A1-A3 in FIG. 22, and therefore the explanations thereof are omitted.

The server #1 accepts the processing request for the data set n+1 from the client CL#1 during the scale-out process (B4). The processing request is transmitted and received based on the data structure of the request data illustrated in FIG. 20. The server #1 refers to the data migration list, and thus determines the migration state of the operation target data set n+1 related to the request data. The migration state of the data set n+1 is the "migrated in progress" state, and hence the server #1, after standing by till the data set n+1 reaches the "already migrated" state, forwards the request data from the client CL#1 to the server #2 (B5).

A reason for standing by till the data set migrated in progress reaches the "already migrated" state is derived from such a point that time expended for the migration is equal to standby time in the normal processing request. The processing is timed out due to a factor on the server side or a load on the network, in which case the information processing system redoes from the processing request of the client similarly to the time-out case in the normal processing request. Accordingly, the information processing system can continue the task.

The server #2 performs the operation of the data set n+1, based on the request data received from the server #1 (B6). After the operation for the data set n+1, the server #2 establishes the connection with the client CL#1, and returns the processing result to the client CL#1 (B7). The processing result is transmitted and received based on the data structure of the result data illustrated in FIG. 21.

The client CL#1 recognizes, from the result data being returned from the server #2 different from the server #1 as the processing requester, that the data set n+1 has been migrated, and dynamically updates the data arrangement of the data set n+1 retained by the client and the connecting destination information. Specifically, in the data set connecting destination list in FIG. 17, the "connecting destination server" with respect to the data set n+1 is updated to the server #2.

<<Operational Example 3>>

An operational example 3 exemplifies an instance that the operation target data set is not migrated to the migration destination server when receiving the processing request from the client during the scale-out process. In this case, the migration source server executes the process based on the processing request.

Figure 24:
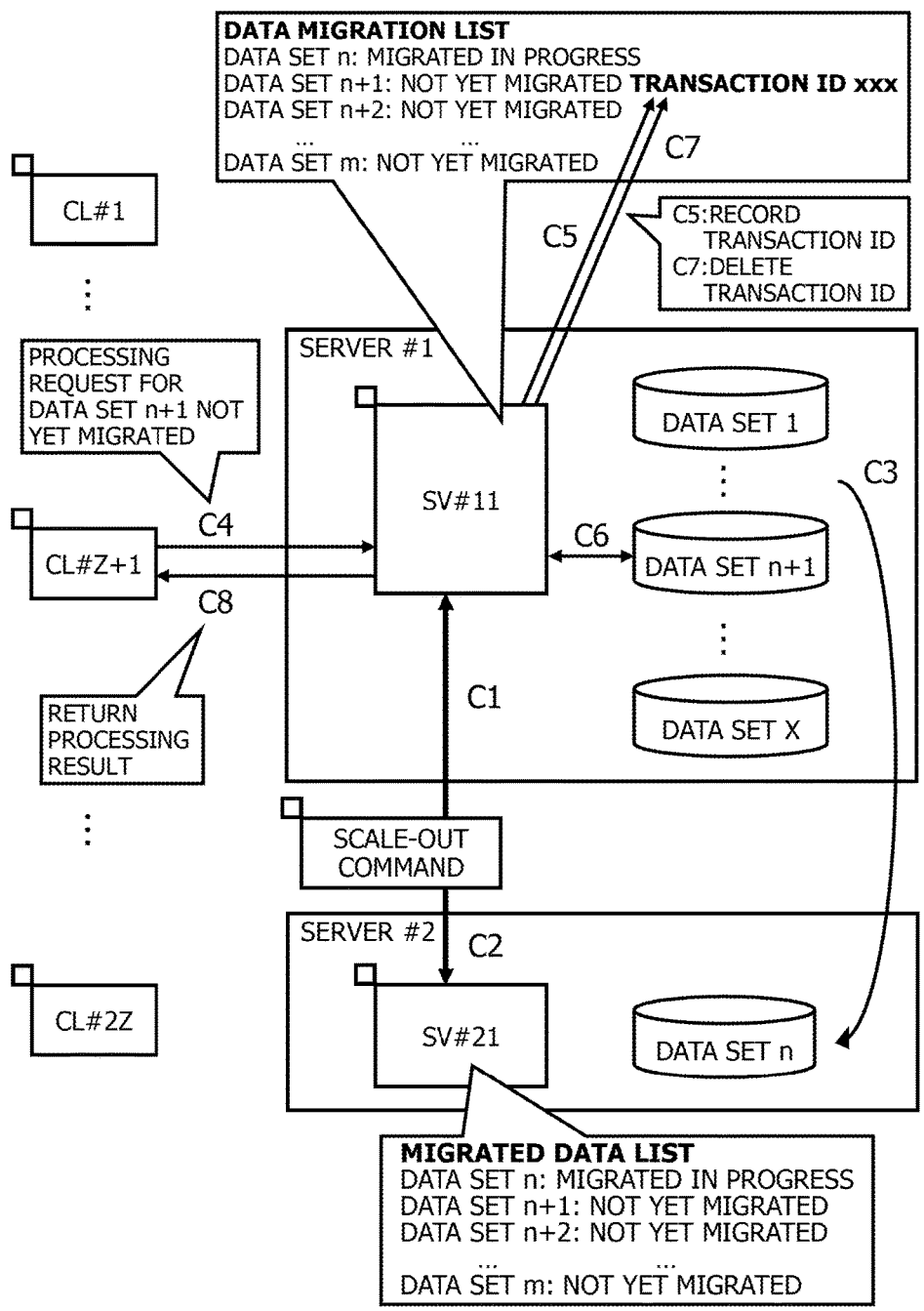
FIG. 24 is a diagram illustrating an operational example when receiving the processing request for the data set not yet migrated.

FIG. 24 is a diagram illustrating an operational example when receiving the processing request for the data set not yet migrated. Processes C1-C4 are the same as the processes B1-B4 in FIG. 23 except a point that the server #1 accepts the processing request from a client CL#Z+1, and hence their explanations are omitted.

The server #1, upon accepting the processing request from the client CL#Z+1, refers to the data migration list, and thus determines the migration state of the operation target data set n+1 related to the request data. The migration state of the data set n+1 is the "not yet migrated" state, and therefore the server #1 executes the process for the data set n+1, based on the request data. The process based on the request data is a process of updating the data set, and the transaction occurs, in which case the server #1 records an ID for identifying the transaction (which will hereinafter be termed a transaction ID) having occurred with respect to the data set n+1 in the data migration list (C5).

The server #1 executes the process based on the request data for the data set n+1 (C6). When the transaction for the process based on the request data is committed or rolled back, the server #1 deletes the transaction ID recorded in the data migration list (C7). To be specific, e.g., the server #1 sets "0" in the transaction ID. The server #1 returns the processing result to the client CL#Z+1 (C8).

<<Operational Example 4>>

An operational example 4 exemplifies an instance of transmitting preferentially the data set not updated to the migration destination server in order to reduce influence on the task when receiving the processing request from the client during the scale-out process.

Figure 25:
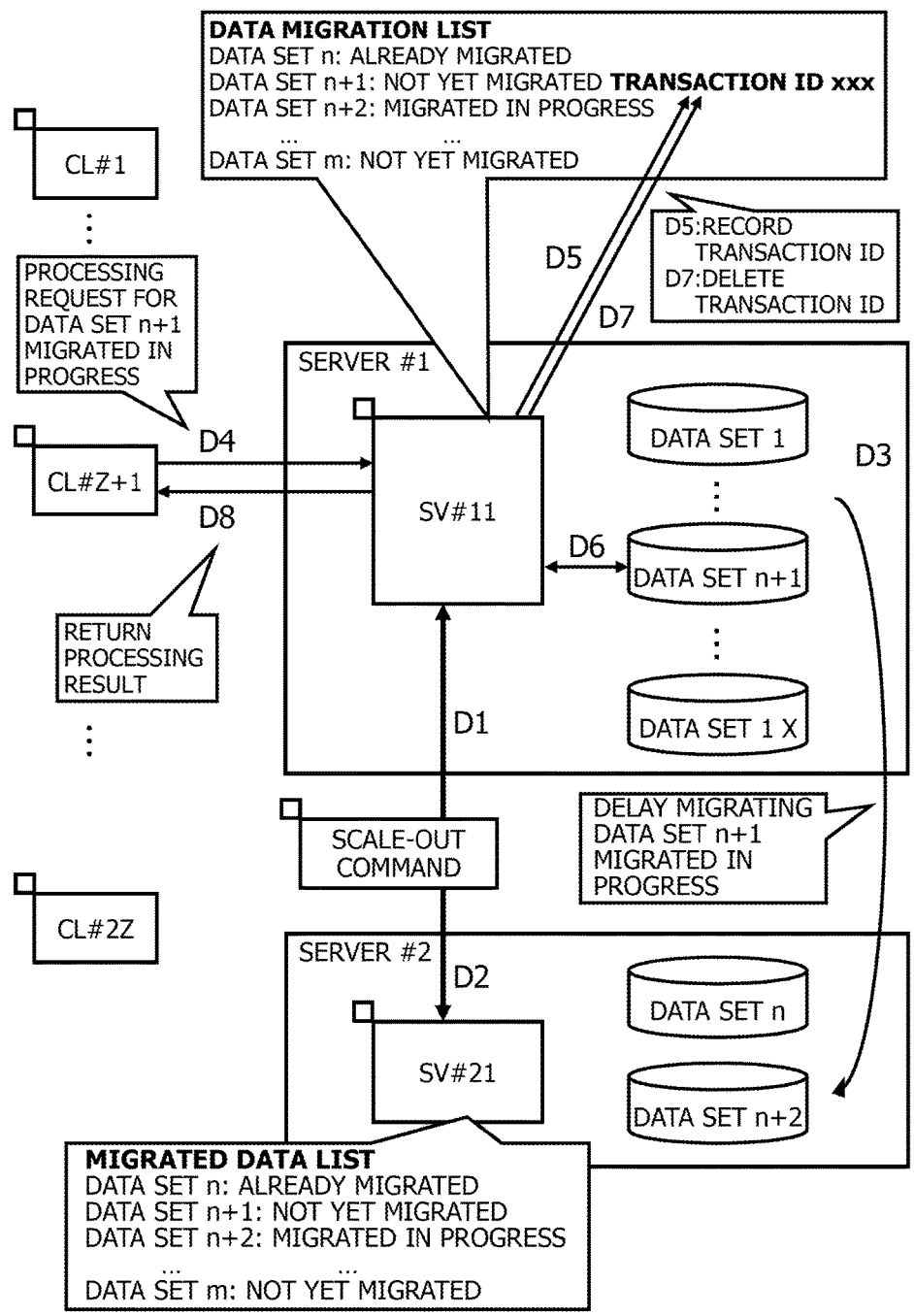
FIG. 25 is a diagram illustrating an operational example when preferentially transmitting the data set not currently updated, to the migration destination server.

FIG. 25 is a diagram illustrating an operational example when transmitting preferentially the data set not currently migrated to the migration destination server. Processes D1-D8 are the same as the processes C1-C8 in FIG. 24, and hence their explanations are omitted.

In the process D3, however, the server #1 delays migrating the data set currently updated till later, and transmits preferentially the data set not currently updated to the migration destination server. The transaction ID about the data set currently updated is recorded in the data migration list. Accordingly, the server #1, when the transaction ID about the migration target data set is recorded, delays migration of this data set until later, and migrates preferentially the next data set to the server #2.

In FIG. 25, the migration state of the data set n+1 is the "not yet migrated" state, and, because of the transaction ID being recorded, the server #1 delays migrating the data set n+1 till later to migrate preferentially the next data set n+2 to the server #2.

The server #1, after migrating the data set n+2 to the migration destination server, migrates sequentially the data sets not currently updated to the server #2. When the transaction about the data set n+1 is committed or rolled back and when the transaction ID is deleted, the server #1 migrates the data set n+1 to the server #2.

<<Operational Example 5>>

An operational example 5 exemplifies such an instance that the operation target data set is currently updated when receiving the processing request from the client during the scale-out process. In this case, the migration source server transmits the data set and a difference caused due to the update to the migration destination server. The migration destination server, after reflecting the difference caused due to the update in the received data set, executes the process for the data set, and returns the processing result to the client.

Figure 26:
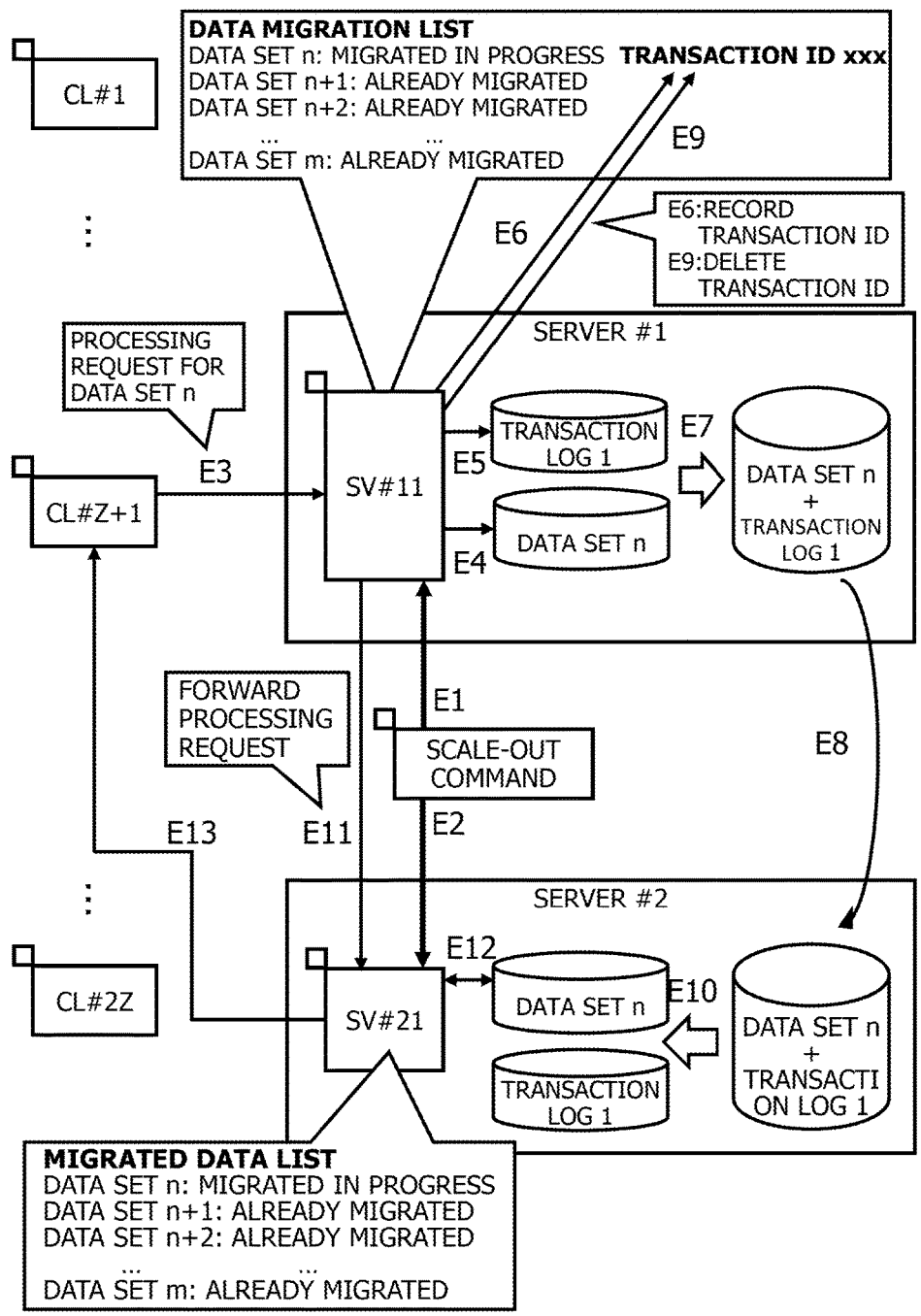
FIG. 26 is a diagram illustrating an operational example when transmitting the data set currently updated, to the migration destination server.

FIG. 26 is a diagram illustrating an operational example when transmitting the data set currently updated to the migration destination server. Processes E1 and E2 are the same as the processes D1 and D2 in FIG. 25, and hence their explanations are omitted.

The server #1 accepts the processing request for the data set n from the client CL#Z+1 during the scale-out process (E3). When the migration state of the data set n is the "not yet migrated" state, the server #1 executes the process for the data set n, based on the request data given from the client CL#Z+1 (E4). The server #1, when the transaction occurs in the process for the data set n, generates a transaction log 1 (E5). The transaction log 1 contains differential data caused due to the update of the data set n, i.e., contains an update state of the transaction in continuation. The server #1 records the transaction ID by being associated with the data set n in the data migration list (E6).

Next, the server #1 generates migration data into which the data set n and the transaction log 1 are assembled (E7). The migration data is generated based on the data structure of the migration data illustrated in FIG. 15. The server #1 transmits the generated migration data to the server #2 (E8). The server #1 deletes the transaction ID associated with the data set n in the data migration list (E9).

The server #2 having received the migration data disassembles the migration data into the data set n and the transaction log 1, and applies the differential data of the transaction log 1 to the data set n (E10). The server #1 forwards the request data given from the client CL#Z+1 to the server #2 (E11). The server #2 executes the process based on the request data with respect to the data set n to which the differential data of the transaction log 1 is applied (E12). The server #2 establishes the connection with the client CL#Z+1, and returns the processing result to the client CL#Z+1 (E13). Note that the result data of the process based on the request data being processed in progress on the server #1 is discarded without being transmitted to the client CL#Z+1 after the transaction log 1 has been generated.

<<Operational Example 6>>

An operational Example 6 exemplifies an instance of dynamically updating the data arrangements and the connecting destination information of the processing request destination, which are retained by each client, after completing the migration of the data sets due to the scale-out. Even when completing the transmission of the migration target data sets to the migration destination server, the data arrangements and the connecting destination information of the processing request destination, which are retained by each client, are not necessarily changed. Therefore, each client, upon receiving the result data in response to the processing request, dynamically updates the data arrangements and the connecting destination information of the processing request destination retained by the client.

Figure 27:
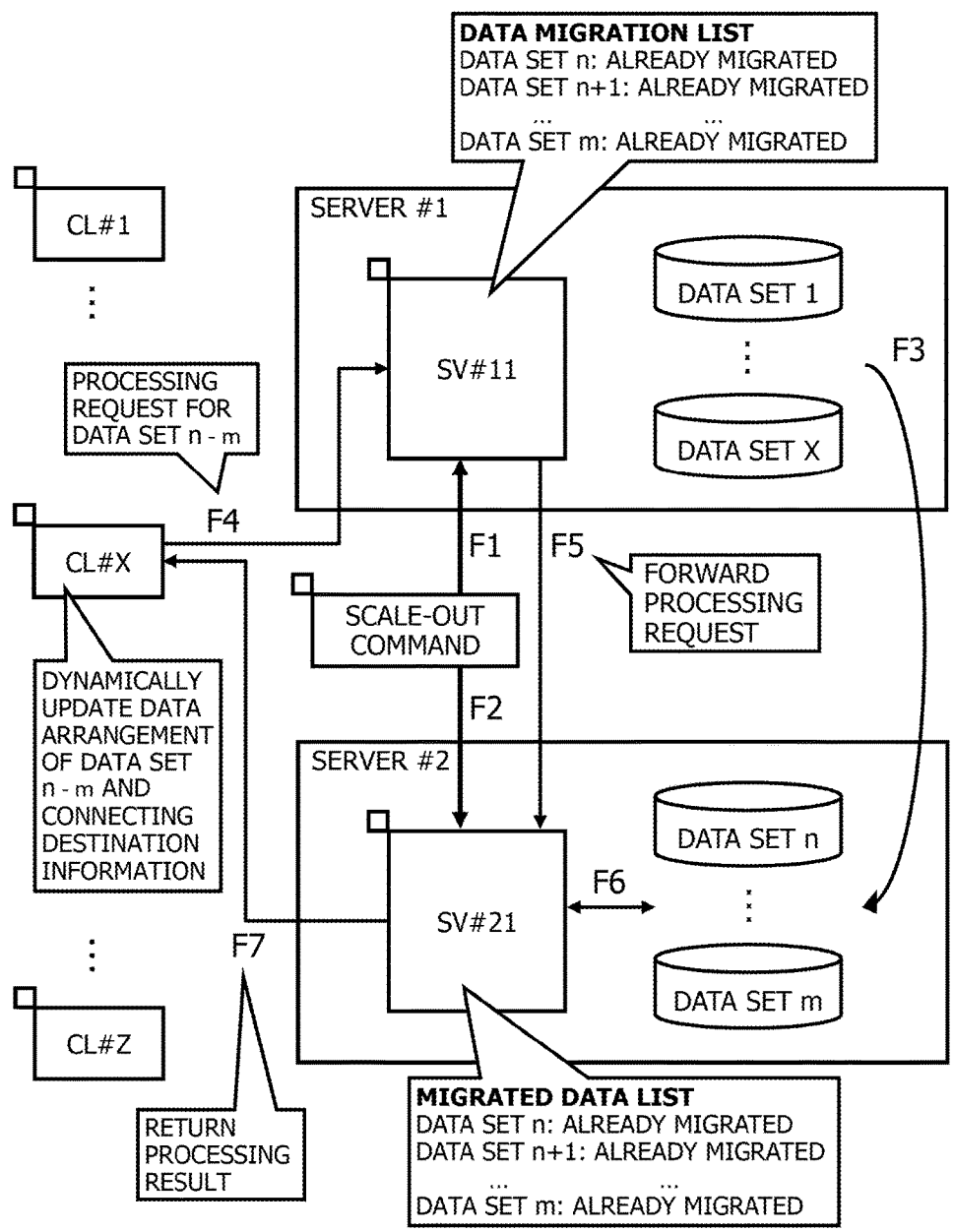
FIG. 27 is a diagram illustrating an example of updating the data arrangements and the connecting destination information in the client apparatus.

FIG. 27 is a diagram illustrating an example of updating the data arrangements and the connecting destination information on the client apparatus. Processes F1-F3 are the same as the processes A1-A3 in FIG. 22, and hence their explanations are omitted.

After completing the migration of the data sets by the scale-out, the server #1 accepts the processing request for the data sets n-m from the client CL#X (F4). The data sets n-m have already been migrated to the server #2, and therefore the request data from the client CL#X is transferred to the server #2 (F5).

The server #2 performs the operation for the data sets n-m, based on the request data received from the server #1 (F6). After the operation for the data sets n-m, the server #2 establishes the connection with the client CL#X, and returns the processing result to the client CL#X (F7).

The client CL#X recognizes, from the result data being returned from the server #2 different from the server #1 as the processing requester, that the data sets n-m have been migrated, and dynamically updates the data arrangements and the connecting destination information of the processing request destination, which are retained by the client CL#X.

Processes in F4 onward are executed for the respective clients CL#1-CL#Z, thereby dynamically updating the data arrangements and the connecting destination information of the processing request destinations of the data sets n-m, which are retained by the respective clients.

The client CL#X, as triggered by receiving the result data, is enabled to update the data arrangements and the connecting destination information of the processing request destinations. When implementing a mechanism for conducting a heartbeat (alive monitoring) from the server to the client, the client may be notified that the data arrangement on the server side has changed in the heartbeat after completing the data migration on the server side by the scale-out. The client can receive the notification that the data arrangements on the server side have changed by attaching this notification to transmission data for the heartbeat.

<<Operational Example 7>>

An operational example 7 exemplifies an instance of performing the scale-out while continuing the task operation without stopping the data access to the server from the client when configuring a cluster system and scaling out the servers operating based on the stateful method.

Figure 28:
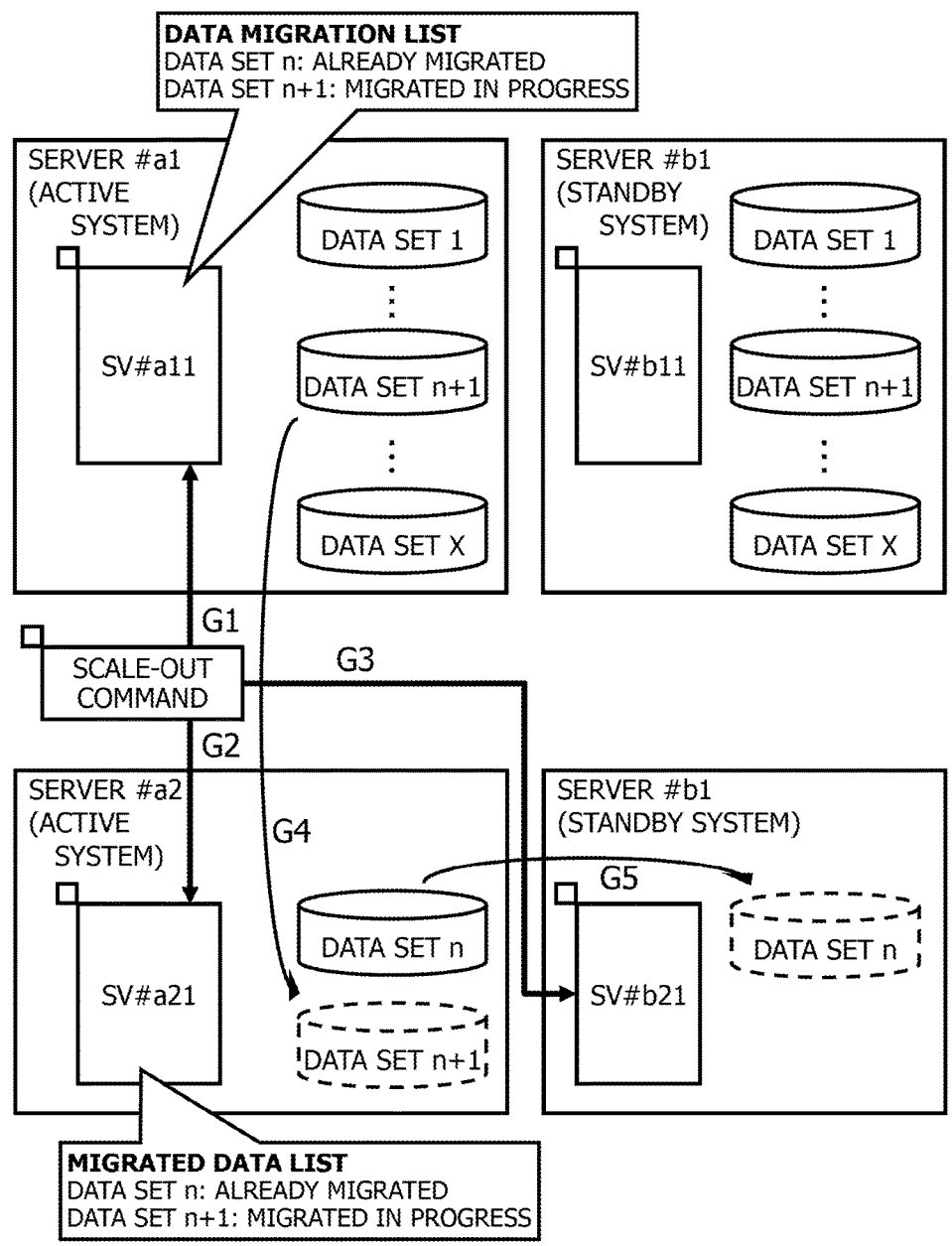
FIG. 28 is a diagram illustrating an operational example of performing the scale-out in a cluster system.

FIG. 28 is a diagram illustrating an operational example when scaling out the servers in the cluster system. The server #a1 configures a cluster system in cooperation with a standby migration source server #b1. The standby migration source server #b1 is one example of a standby migration source information processing apparatus. Processes G1 and G2 are the same as the processes A1 and A2 in FIG. 22, and hence their explanations are omitted.

The scale-out command is issued also to a standby migration destination server #b2 (G3). The server #a1 having accepted the scale-out instruction by the scale-out command generates the data migration list. In the example of FIG. 28, the migration target data sets are the data set n and the data set n+1. The server #a1, when receiving the scale-out instruction, receives also information about the migration destination server and the migration target data. The server #a1, when a plurality of migration destination servers is prepared, receives information indicating which server is in an active system. For example, the server #a1 may deem the server designated first to be the active server.

Similarly, the server #a2 having accepted the scale-out instruction generates the migrated data list. In the example of FIG. 28, the migrated target data sets are the data set n and the data set n+1.

Next, the server #a1 migrates the data sets contained in the data migration list to the server #a2 (G4). The active migration destination server #a2 synchronizes the data with standby migration destination server #b2 (G5). Alternatively, the data synchronization may also be carried out by incorporating the standby migration destination server #b2 after completing the data migration to the migration destination server #a2. The standby migration destination server #b2 is one example of a standby migration destination information processing apparatus.

A control technology of mirroring the data between the memories and a technology of synchronizing the data of the servers incorporated in the cluster system (refer to, e.g., International Publication WO 2008/105098, Japanese Laid-Open Patent Publication No. 2012-234333, and other equivalent patent documents) are known as technologies of synchronizing the data between the active server and the standby server.

<Processing Flow>

FIGS. 29 through 37B are explanatory flowcharts each illustrating a flow of a control process of the server apparatus 2a in the embodiment. FIGS. 38A through 39 are explanatory flowcharts each illustrating a flow of a control process of the client apparatus 2b in the embodiment.

Figure 29:
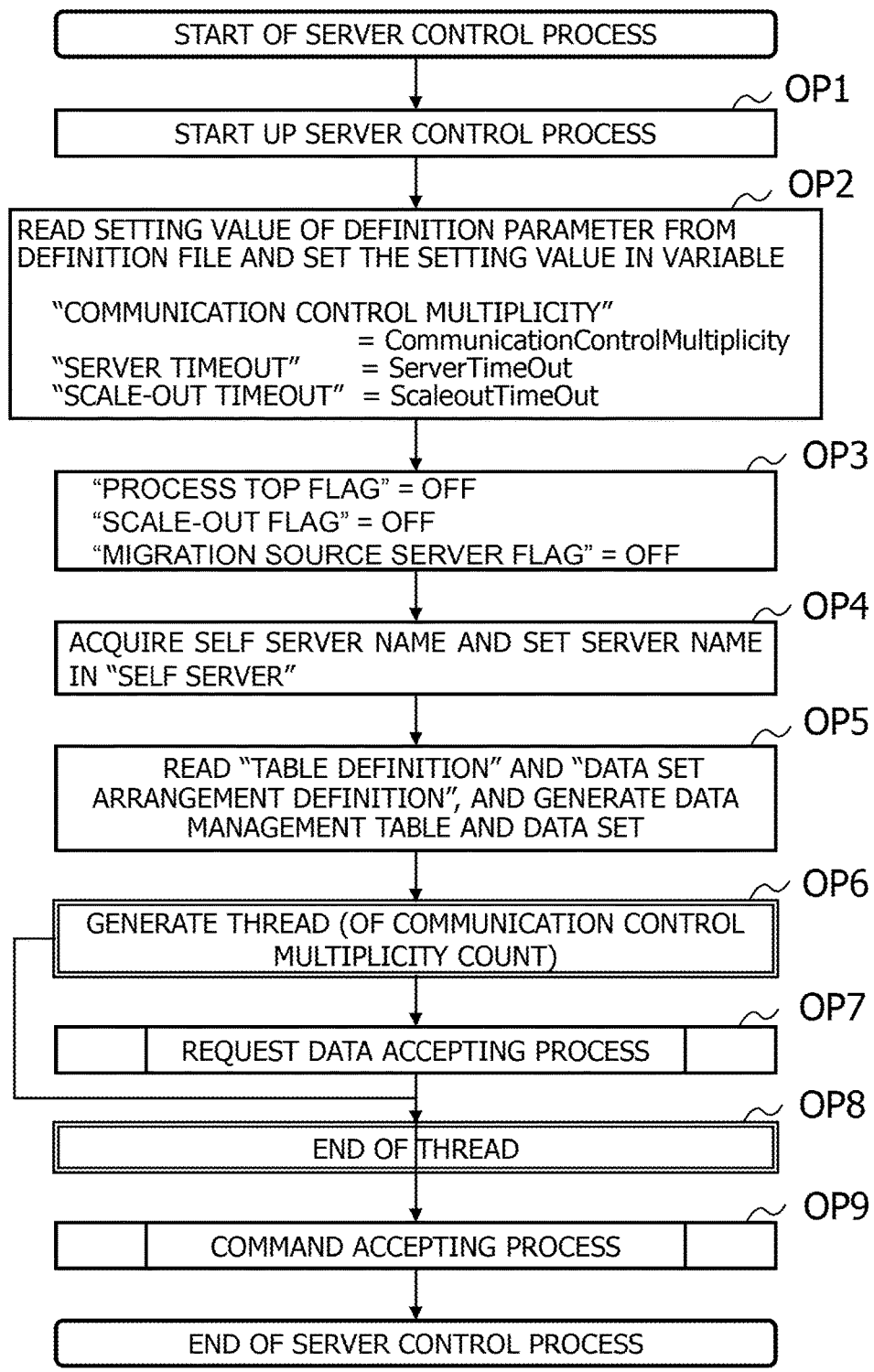
FIG. 29 is a flowchart, given as one example, of a server control process.

FIG. 29 is one example of the flowchart of the server control process. A start of the server control process is triggered by, e.g., booting the server. In OP1, the server apparatus 2a starts up the server control process. Next, the processing advances to OP2.

In OP2, the server apparatus 2a reads the setting values of the definition parameters from the definition file 41a of the server apparatus 2a, and sets the setting values as variables. To be specific, the server apparatus 2a enters the setting values of CommunicationControlMultiplicity, ServerTimeOut and ScaleoutTimeOut in the "communication control multiplicity" field, the "server timeout" field and the "scale-out timeout" field. Next, the processing advances to OP3.

In OP3, the server apparatus 2a set "OFF" in a "process stop flag", a "scale-out flag" and a "migration source server flag". Subsequently, the processing advances to OP4. In OP4, the server apparatus 2a acquires a name of self server, and enters the self-server name in a "self server" field. Next, the processing advances to OP5.

In OP5, the server apparatus 2a reads the "table definitions" (FIGS. 9A, 9B) and the "data set arrangement definition (FIG. 9C), and generates a data management table and the data sets. Next, the processing advances to OP6.

In OP6, the server apparatus 2a generates threads of the communication control multiplicity count. Next, the processing advances to OP7 and OP9. In OP7, the server apparatus 2a executes a request data accepting process. Subsequently, the processing advances to OP8. In OP8, the server apparatus 2a finishes the threads. In OP9, the server apparatus 2a executes a command accepting process, and finishes the server control process.

Figure 30:
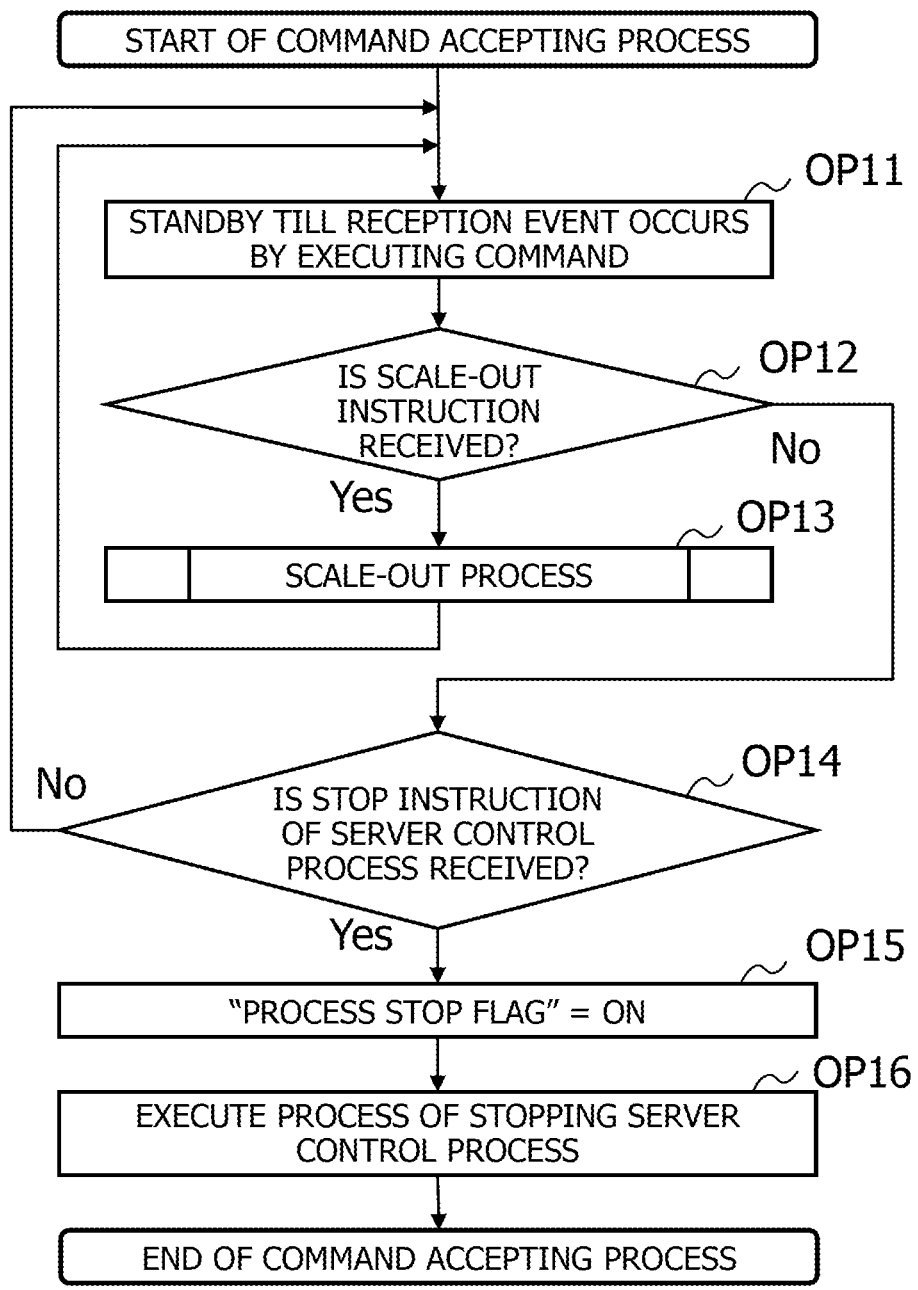
FIG. 30 is a flowchart, given as one example, of a command accepting process.

FIG. 30 is one example of the flowchart of the command accepting process. FIG. 30 illustrates details of the command accepting process in OP9. In OP11, the server apparatus 2a stands by till a reception event occurs due to executing the command. Next, the processing advances to OP12.

In OP12, the server apparatus 2a determines whether the scale-out instruction is received or not. When receiving the scale-out instruction (OP12: Yes), the processing advances to OP13. Whereas when not receiving the scale-out instruction (OP12: No), the processing diverts to OP14.

In OP13, the server apparatus 2a executes a scale-out process, and the processing loops back to OP11. In OP14, the server apparatus 2a determines whether a server control process stop instruction is received. When receiving the server control process stop instruction (OP14: Yes), the processing advances to OP15. Whereas when not receiving the server control process stop instruction (OP14: No), the processing loops back to OP11.

In OP15, the server apparatus 2a sets "ON" in a "process stop flag". Subsequently, the processing advances to OP16. In OP16, the server apparatus 2a executes a server control process stop process, and finishes the command accepting process.

Figure 31:
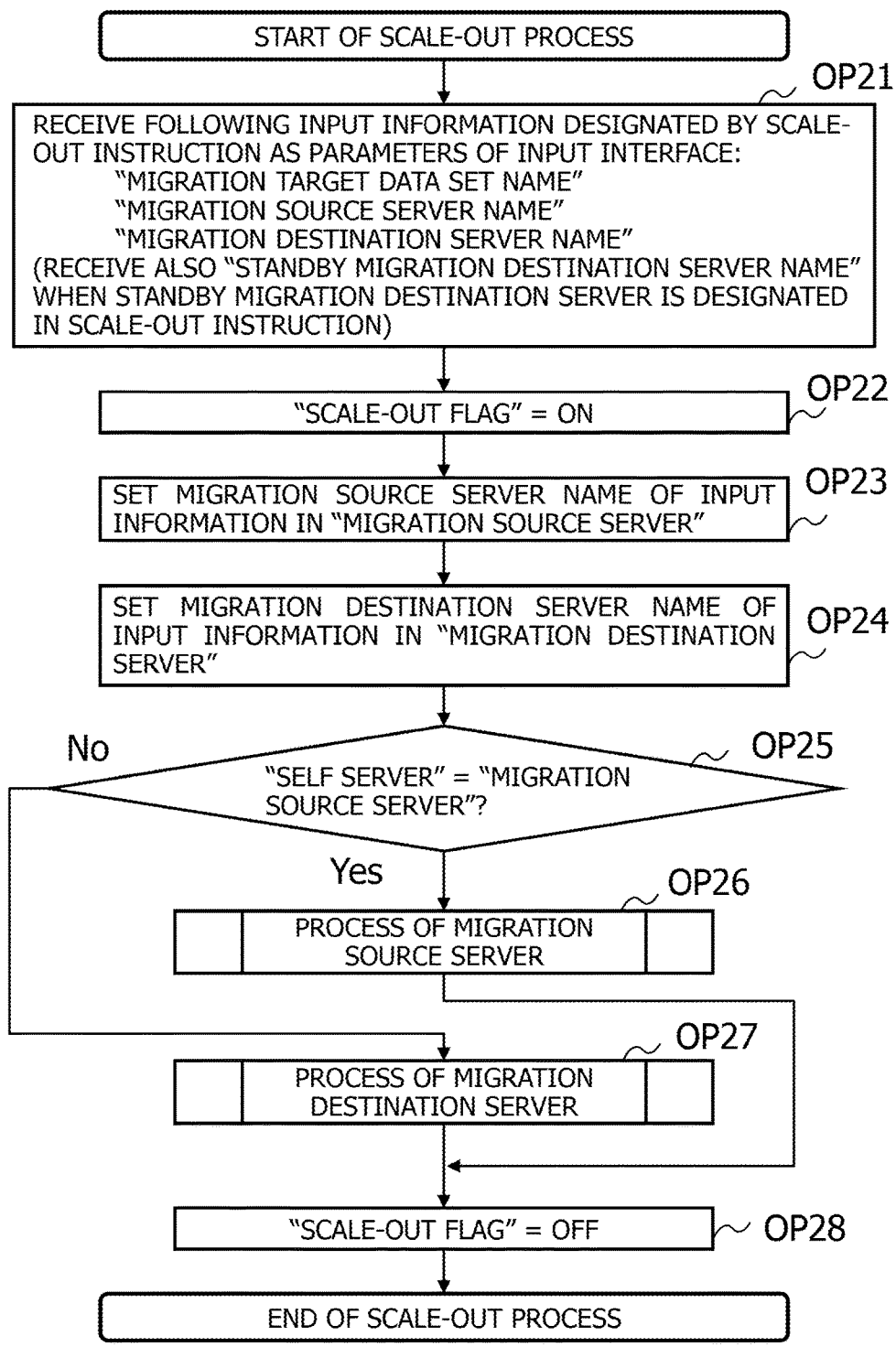
FIG. 31 is a flowchart, given as one example, of a scale-out process.

FIG. 31 is one example of the flowchart of the scale-out process. FIG. 31 illustrates details of the scale-out process in OP13 of FIG. 30. In OP21, the server apparatus 2a receives input information designated by the scale-out instruction as a parameter of the input interface. The input information contains a "migration target data set name", a "migration source server name" and a "migration destination server name". When the standby migration destination server is designated in the scale-out instruction, the server apparatus 2a receives also the "standby migration destination server name" as the input information. Subsequently, the processing advances to OP22.

In OP22, the server apparatus 2a sets "ON" in the "scale-out flag". Next, the processing advances to OP23. In OP23, the server apparatus 2a sets the "migration source server name" of the input information in the "migration source server". Next, the processing advances to OP24.

In OP24, the server apparatus 2a sets the "migration destination server name" of the input information in the "migration destination server". Subsequently, the processing advances to OP25. In OP25, the server apparatus 2a determines whether the "self server" is the "migration source server". In other words, the server apparatus 2a determines whether the self apparatus I the migration source server. When the self apparatus is the migration source server (OP25: Yes), the processing advances to OP26. Whereas when the self apparatus is not the migration source server (OP25: No), the processing advances to OP27.

In OP26, the server apparatus 2a executes a process of the migration source server. The process of the migration source server is a process of transmitting the migration data to the migration destination server. Subsequently, the processing advances to OP28. In OP27, the server apparatus 2a executes a process of the migration destination server. The process of the migration destination server is a process of receiving the migration data from the migration destination server. Subsequently, the processing advances to OP28. In OP28, the server apparatus 2a sets "OFF" in the "scale-out flag", and finishes the scale-out process.

Figure 32:
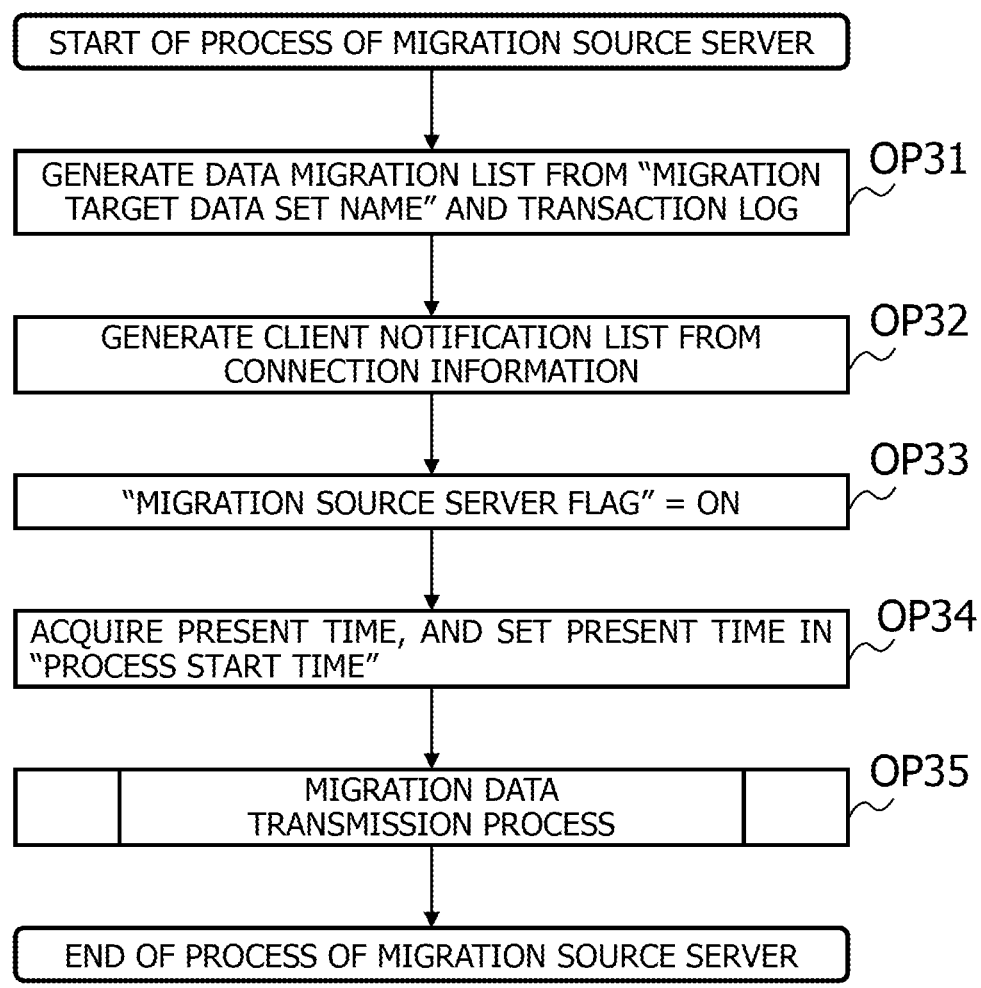
FIG. 32 is a flowchart, given as one example, of a process of the migration source server.

FIG. 32 is one example of the flowchart of the process of the migration source server. FIG. 32 illustrates details of the process of the migration source server in OP26. In OP31, the server apparatus 2a generates the data migration list from the "migration target data set names" (FIG. 31, OP21) of the input information and the transaction log. Next, the processing advances to OP32.

In OP32, the server apparatus 2a generates the client notification list from the connection information. The client notification list is compiled to manage whether the notification of the change of the data arrangement due to the scale-out is made. Upon completing the notification to each client apparatus 2b, the server apparatus 2a may not retain the information on the change of the data arrangement. While on the other hand, when continuing to retain the information on the change of the data arrangement, the client notification list may not be generated. Next, the processing advances to OP33.

In OP33, the server apparatus 2a sets "ON" in the "migration source server flag". Subsequently, the processing advances to OP34. In OP34, the server apparatus 2a acquires the present time, and sets the present time in the "process start time". Next, the processing advances to OP35. In OP35, the server apparatus 2a executes the migration data transmission process, and finishes the process of the migration source server.

Figure 33:
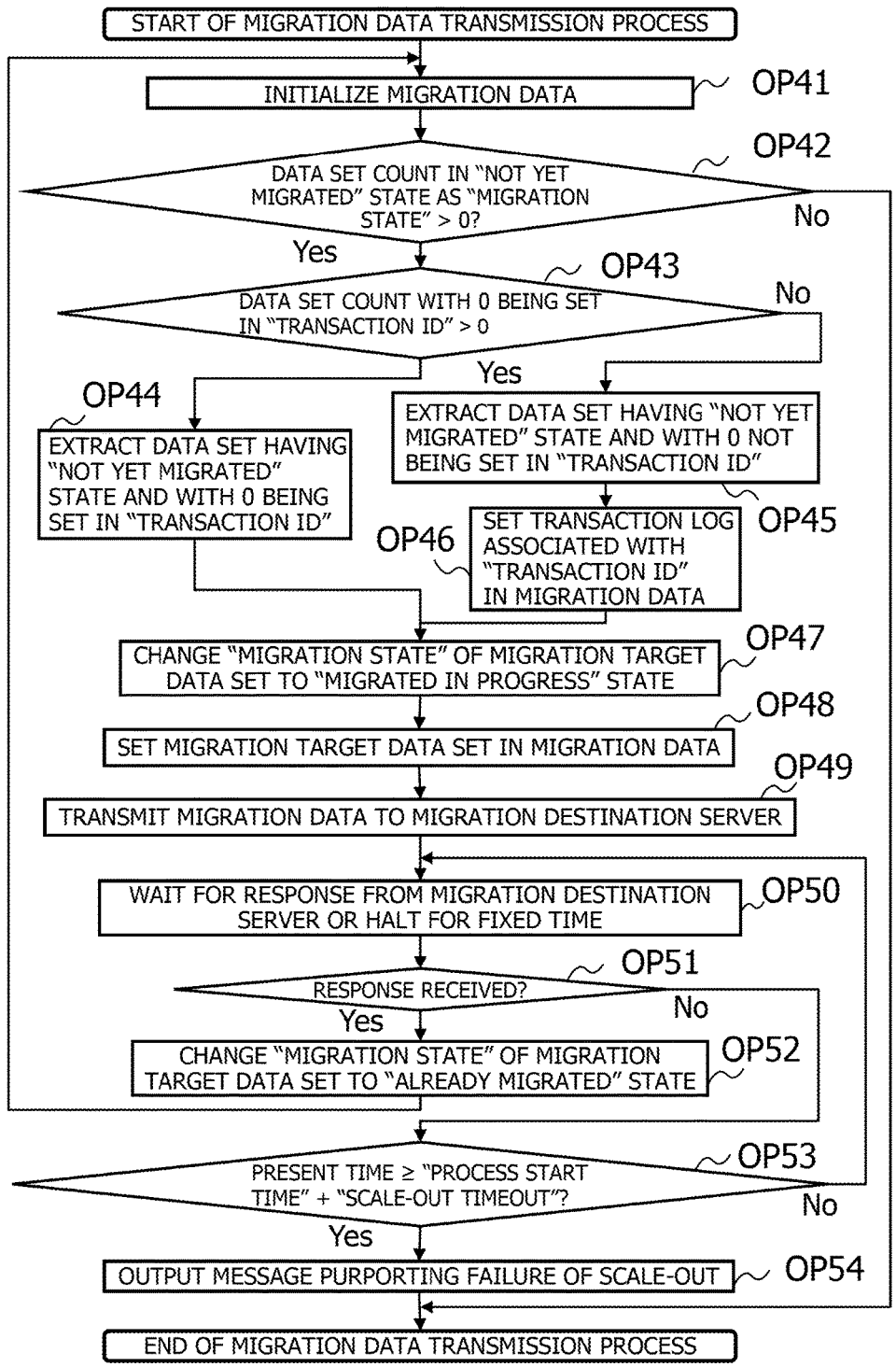
FIG. 33 is a flowchart, given as one example, of a migration data transmission process.
Figure 35:
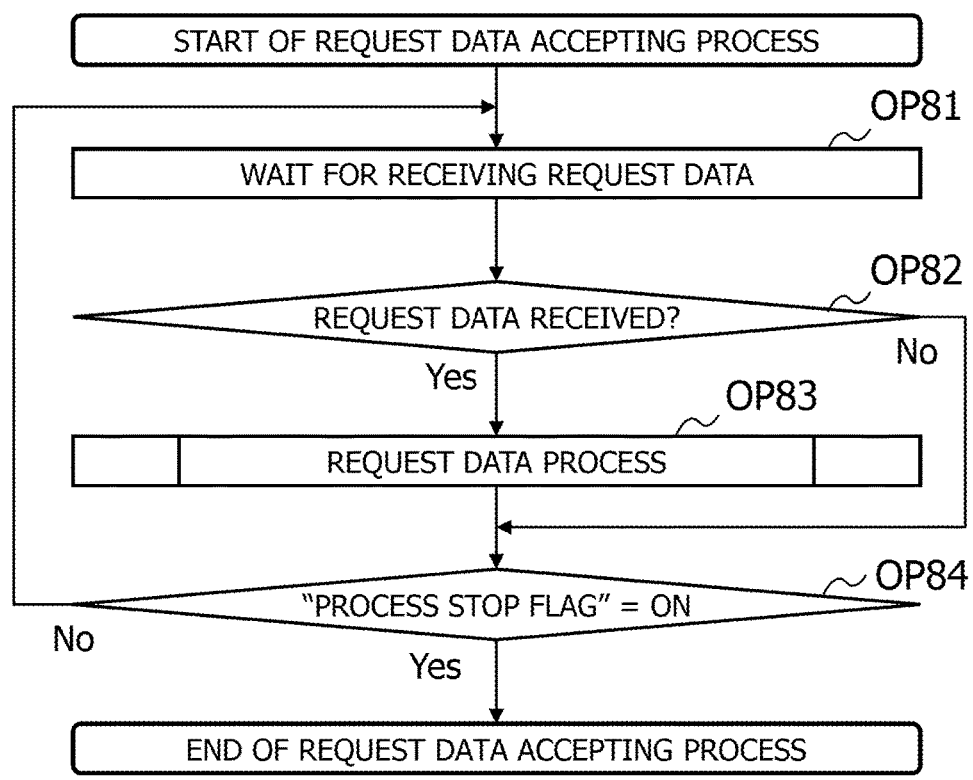
FIG. 35 is a flowchart, given as one example, of a request data accepting process.

FIG. 33 is one example of the flowchart of the migration data transmission process. FIG. 35 illustrates details of the migration data transmission process in OP35 of FIG. 32. The server apparatus 2a executes processes in OP41 through OP54 of FIG. 33 through the migration unit 53.

In OP41, the server apparatus 2a initializes the migration data. Subsequently, the processing advances to OP42. In OP42, the server apparatus 2a determines whether the data set count in the "not yet migrated" state as the "migration state" is larger than "0" in the data migration list. When the data set count in the "not yet migrated" state is larger than "0" (OP42: Yes), the processing advances to OP43. Whereas when the data set count in the "not yet migrated" state is equal to "0" (OP42: No), the migration data transmission process comes to an end.

In OP43, the server apparatus 2a determines whether the data set count with "0" being entered in the "transaction ID" field is larger than "0" in the data migration list. When the data set count with "0" being entered in the "transaction ID" field is larger than "0" (OP43: Yes), the processing advances to OP44. Whereas when the data set count with "0" being entered in the "transaction ID" field is equal to "0" (OP43: No), the processing advances to OP45.

In OP44, the server apparatus 2a extracts the data sets with the "not yet migrated" state being entered in the "migration state" field and with "0" being entered in the "transaction ID" field in the data migration list. Subsequently, the processing advances to OP47. In OP45, the server apparatus 2a extracts the data sets with the "not yet migrated" state being entered in the "migration state" field and with "0" not being entered in the "transaction ID" field in the data migration list. Next, the processing advances to OP46. In OP46, the server apparatus 2a sets the transaction log associated with the "transaction ID" in the migration data. Subsequently, the processing advances to OP47.

In OP47, the server apparatus 2a changes the "migration state" of the migration target data set to the "migrated in progress" state. Subsequently, the processing advances to OP48. In OP48, the server apparatus 2a sets the migration target data sets in the migration data. Subsequently, the processing advances to OP49.

In OP49, the server apparatus 2a transmits the migration data to the migration destination server. Subsequently, the processing advances to OP50. In OP50, the server apparatus 2a waits for a response to be given from the migration destination server or halts for a fixed period of time. The fixed period of time is, e.g., 10 ms. Next, the processing advances to OP51.

In OP51, the server apparatus 2a determines whether a response is received from the migration destination server. When receiving the response from the migration destination server (OP51: Yes), the processing advances to OP52. Whereas when not receiving the response from the migration destination server (OP51: No), the processing advances to OP53. In Op52, the server apparatus 2a changes the "migration state" of the migration target data set to the "already migrated" state. Subsequently, the processing loops back to OP41.

In OP53, the server apparatus 2a determines whether a relation of "Present Time Process Start Time+Scale-Out Timeout" is established. In other words, the server apparatus 2a determines whether response waiting time from the migration destination server is equal to or longer than the predetermined period of time. When the response waiting time from the migration destination server is equal to or longer than the predetermined period of time (OP53: Yes), the processing advances to OP54. Whereas when the response waiting time from the migration destination server is shorter than the predetermined period of time (OP53: No), the processing loops back to OP50. In OP54, the server apparatus 2a outputs a message purporting that the scale-out results in a failure due to the timeout of the wait for the response from the migration destination server, and terminates the migration data transmission process.

Figure 34:
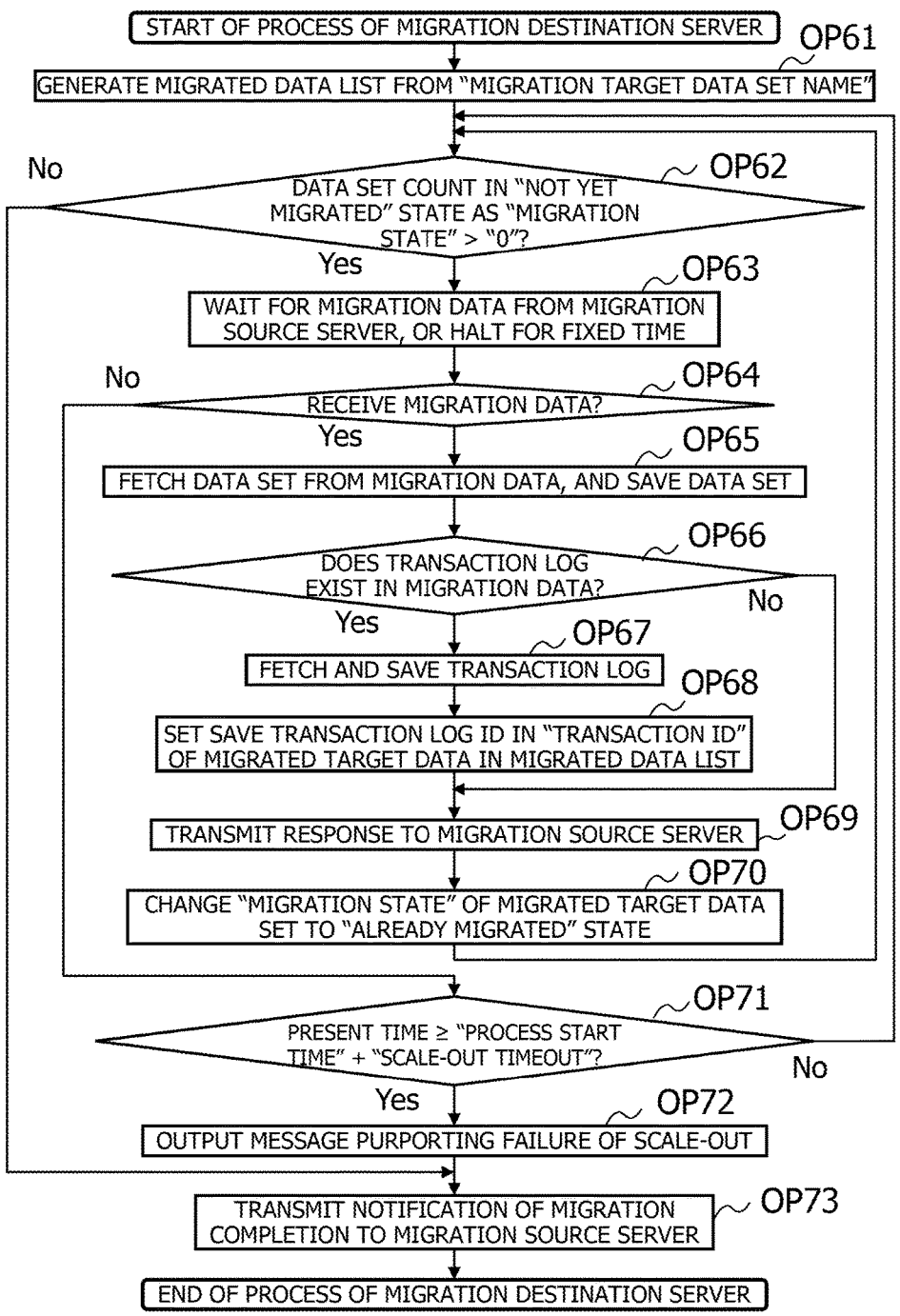
FIG. 34 is a flowchart, given as one example, of a process of the migration destination server.

FIG. 34 is one example of the flowchart of the process of the migration destination server. FIG. 34 illustrates details of the process of the migration destination server in OP27 of FIG. 31. In Op61, the server apparatus 2a generates the migrated data list from the "migration target data set name" (OP21 in FIG. 31) of the input information. Next, the processing advances to OP62.

In OP62, the server apparatus 2a determines whether the data set count in the "not yet migrated" state as the "migration state" is larger than "0" in the data migration list. When the data set count in the "not yet migrated" state is larger than "0" (OP62: Yes), the processing advances to OP63. Whereas when the data set count in the "not yet migrated" state is equal to "0" (OP62: No), the processing advances to OP73.

In OP63, the server apparatus 2a waits for the migration data from the migration source server, or halts for a fixed period of time. The fixed period of time is, e.g., 10 ms. Next, the processing advances to OP64. In OP64, the server apparatus 2a determines whether the migration data is received from the migration source server. When receiving the migration data (OP64: Yes), the processing advances to OP65. Whereas when not receiving the migration data (OP64: No), the processing diverts to OP71.

In OP65, the server apparatus 2a fetches the data set from the migration data, and saves the fetched data set. Subsequently, the processing advances to OP66. In OP66, the server apparatus 2a determines whether the transaction log exists in the migration data. When the transaction log exists therein (OP66: Yes), the processing advances to OP67. Whereas when the transaction log does not exist (OP66: No), the processing diverts to OP69.

In OP67, the server apparatus 2a fetches the transaction log from the migration data, and saves the fetched log. Next, the processing advances to OP68. In OP68, the server apparatus 2a enters the ID of the saved transaction log in the "transaction ID" field of the migrated target data set in the migrated data list. Next, the processing advances to OP69.

In OP69, the server apparatus 2a transmits a response to the migration source server. Subsequently, the processing advances to OP70. In OP70, the server apparatus 2a changes the "migration state" of the migrated target data set to the "already migrated" state. Next, the processing loops back to OP62.

In OP71, the server apparatus 2a determines whether a relation of "Present Time Process Start Time+Scale-Out Timeout" is established. In other words, the server apparatus 2a determines whether reception waiting time of the migration data from the migration source server is equal to or longer than the predetermined period of time. When the reception waiting time is equal to or longer than the predetermined period of time (OP71: Yes), the processing advances to OP72. Whereas when the reception waiting time is shorter than the predetermined period of time (OP71: No), the processing loops back to OP62.

In OP72, the server apparatus 2a outputs a message purporting that the scale-out results in a failure due to the timeout of the wait for receiving the migration data from the migration source server. Subsequently, the processing advances to OP73. In OP73, the server apparatus 2a transmits migration completion notification to the migration source server, and finishes the migration destination server.

FIG. 35 is one example of the flowchart of the request data accepting process. FIG. 35 illustrates details of the request data accepting process in OP7 of FIG. 29. In OP81, the server apparatus 2a stands by for receiving the request data. Next, the processing advances to OP82.

In OP82, the server apparatus 2a determines whether the request data is received. When receiving the request data (OP82: Yes), the processing advances to OP83. Whereas when not receiving the request data (OP82: No), the processing advances to OP84.

In OP83, the server apparatus 2a executes the request data process. Next, the processing advances to OP84. In OP84, the server apparatus 2a determines whether "ON" is set in the "process stop flag". When "ON" is set in the "process stop flag" (OP84: Yes), the request data accepting process comes to an end. Whereas when "ON" is not set in the "process stop flag" (OP84: No), the processing loops back to OP81.

Figure 36A:
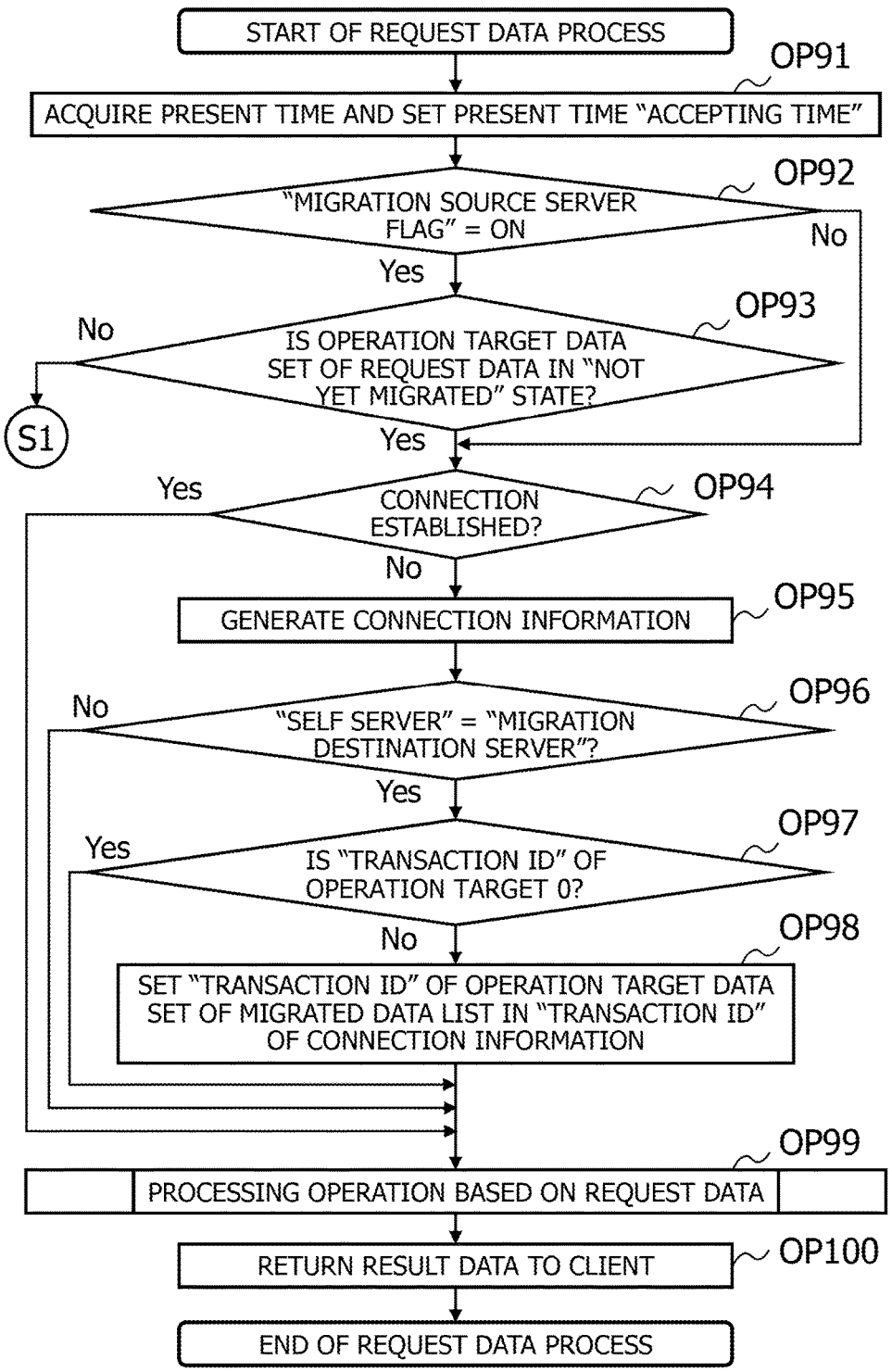
FIG. 36A is a flowchart, given as one example, of a request data process.

FIGS. 36A and 36B are one example of the flowchart of the request data process. FIGS. 36A and 36B illustrate details of the request data process in OP83 of FIG. 35. FIG. 36A illustrates a process in such an instance that the operation target data set of the request data is not migrated to the migration destination server.

In OP91, the server apparatus 2a acquires the present time and sets the acquired present time in "acceptance time". Subsequently, the processing advances to OP92. In OP92, the server apparatus 2a determines whether "ON" is set in a "migration source server flag". When "ON" is set in the "migration source server flag" (OP92: Yes), the processing advances to OP93. Whereas when "ON" is not set in the "migration source server flag" (OP92: No), the processing diverts to OP94.

In OP93, the server apparatus 2a determines whether the operation target data set of the request data is in the "not yet migrated" state in the data migration list. When the operation target data set is in the "not yet migrated" state (OP93: Yes), the processing advances to OP94. Whereas when the operation target data set is not in the "not yet migrated" state (OP93: No), the processing shifts to S1 in FIG. 36B.

In OP94, the server apparatus 2a determines whether the connection with the client apparatus 2b having transmitted the request data is established. When the connection is established (OP94: Yes), the processing diverts to OP99. Whereas when the connection is not established (OP94: No), the processing advances to OP95.

In OP95, the server apparatus 2a generates connection information with the client apparatus 2b having transmitted the request data. Next, the processing advances to OP96. In OP96, the server apparatus 2a determines whether the "self server" is the "migration destination server". In other words, the server apparatus 2a determines whether the self apparatus is the migration destination server. When the self apparatus is the migration destination server (OP96: Yes), the processing advances to OP97. Whereas when the self apparatus is not the migration destination server (OP96: No), the processing diverts to OP99.

In OP97, the server apparatus 2a determines whether "0" is entered in the "transaction ID" field of the operation target data set in the migrated data list. When "0" is entered in the "transaction ID" field of the operation target data set (OP97: Yes), the processing diverts to OP99. Whereas when "0" is not entered in the "transaction ID" field of the operation target data set (OP97: No), the processing advances to OP98.

In OP98, the server apparatus 2a sets a value of the "transaction ID" field of the operation target data set in the migrated data list in the "transaction ID" field of the connection information. Next, the processing advances to OP99.

In OP99, the server apparatus 2a performs the processing operation based on the request data. Subsequently, the processing advances to OP100. In OP100, the server apparatus 2a returns the result data of the processing operation based on the request data to the client, and finishes the request data process. The server apparatus 2a executes the process in OP100 through the response unit 52.

FIG. 36B illustrates a process in such an instance that the operation target data set of the request data is migrated in progress or already migrated to the migration destination server. The processing advances to OP111 next to S1 in FIG. 36A. In OP111, the server apparatus 2a determines whether the operation target data set of the request data is in the "migrated in progress" state. When the operation target data set is in the "migrated in progress" state (OP111: Yes), the processing advances to OP112. Whereas when the operation target data set is not in the "migrated in progress" state (OP111: No), the processing diverts to OP114.

In OP112, the server apparatus 2a stands by for a fixed period of time. The fixed period time is, e.g., 1 ms. Next, the processing advances to OP113. In OP113, the server apparatus 2a determines whether time set to the "server timeout" from the "acceptance time" elapses. When the time set to the "server timeout" from the "acceptance time" elapses (OP113: Yes), the processing diverts to S2 in FIG. 37B. Whereas when the time set to the "server timeout" from the "acceptance time" does not elapse (OP113: No), the processing loops back to OP111.

In OP114, the server apparatus 2a transmits the request data to the migration destination server because of the operation target data set of the request data being in the "already migrated" state. The server apparatus 2a executes the process in OP114 through the processing request transmission unit 54. Subsequently, the processing advances to OP115.

In OP115, the server apparatus 2a sets an "already notified" state in the "client notification state" field in the client notification list. Next, the processing advances to OP116. In OP116, the server apparatus 2a determines whether there exists the client apparatus 2b with a "not yet notified" state being entered in the "client notification state" field in the client notification list. When there exists the client apparatus 2b with the "not yet notified" state being entered in the "client notification state" field (OP116: Yes), the processing diverts to OP119. Whereas when there does not exist the client apparatus 2b with the "not yet notified" state being entered in the "client notification state" field (OP116: No), the processing advances to OP117. Note that when the client notification list is not generated in OP32 of FIG. 32, the processes in OP115 and OP116 are omitted.

In OP117, the server apparatus 2a determines whether "OFF" is set in the "scale-out flag". When "OFF" is set in the "scale-out flag" (OP117: Yes), the processing advances to OP118. Whereas when "OFF" is not set in the "scale-out flag" (OP117: No), the processing diverts to OP119.

In OP118, the server apparatus 2a sets "OFF" in the "migration source server flag". Subsequently, the processing advances to OP119. In OP119, the server apparatus 2a deletes the connection information about the client apparatus 2b having transmitted the request data, and terminates the request data process.

Figure 37A:
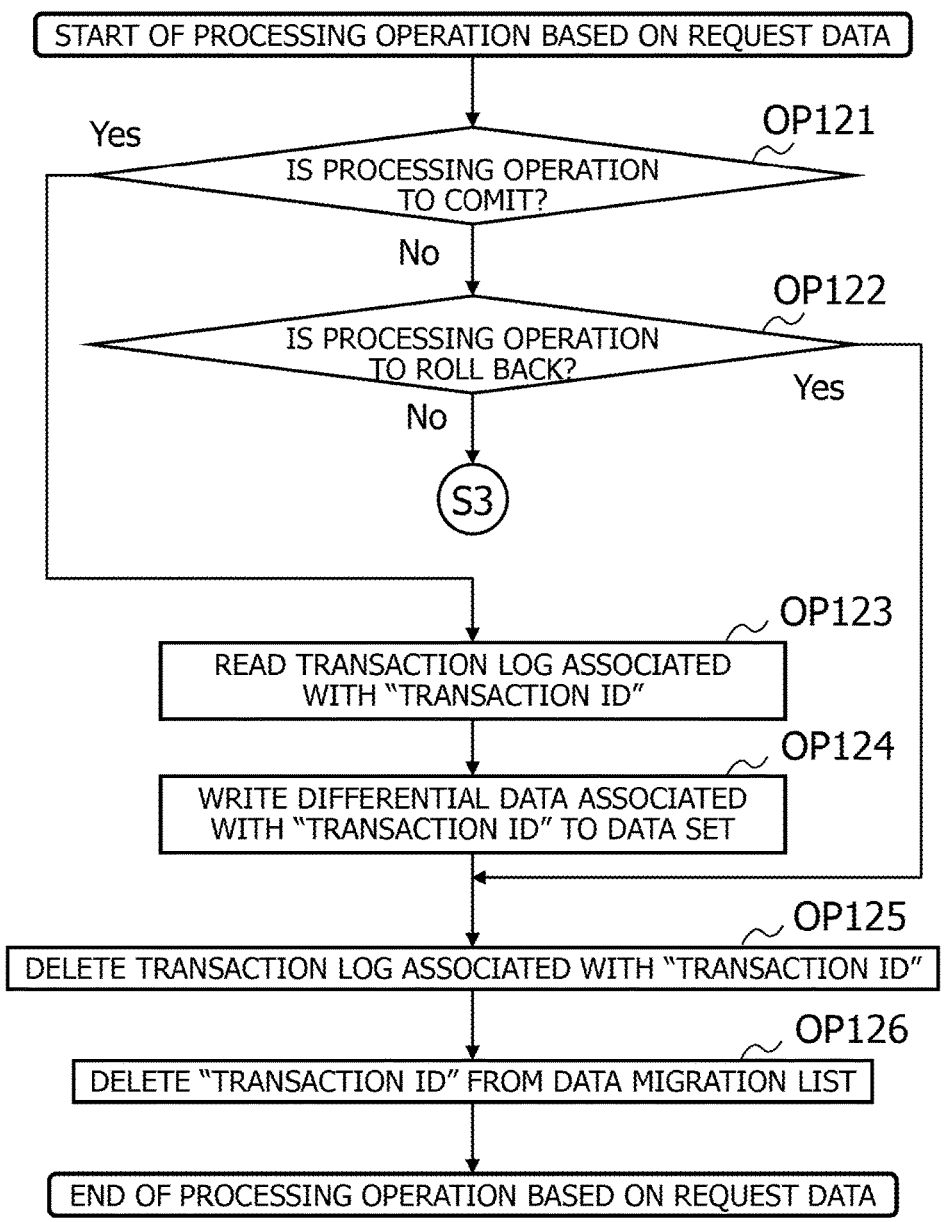
FIG. 37A is a flowchart, given as one example, of a processing operation based on the request data.
Figure 38A:
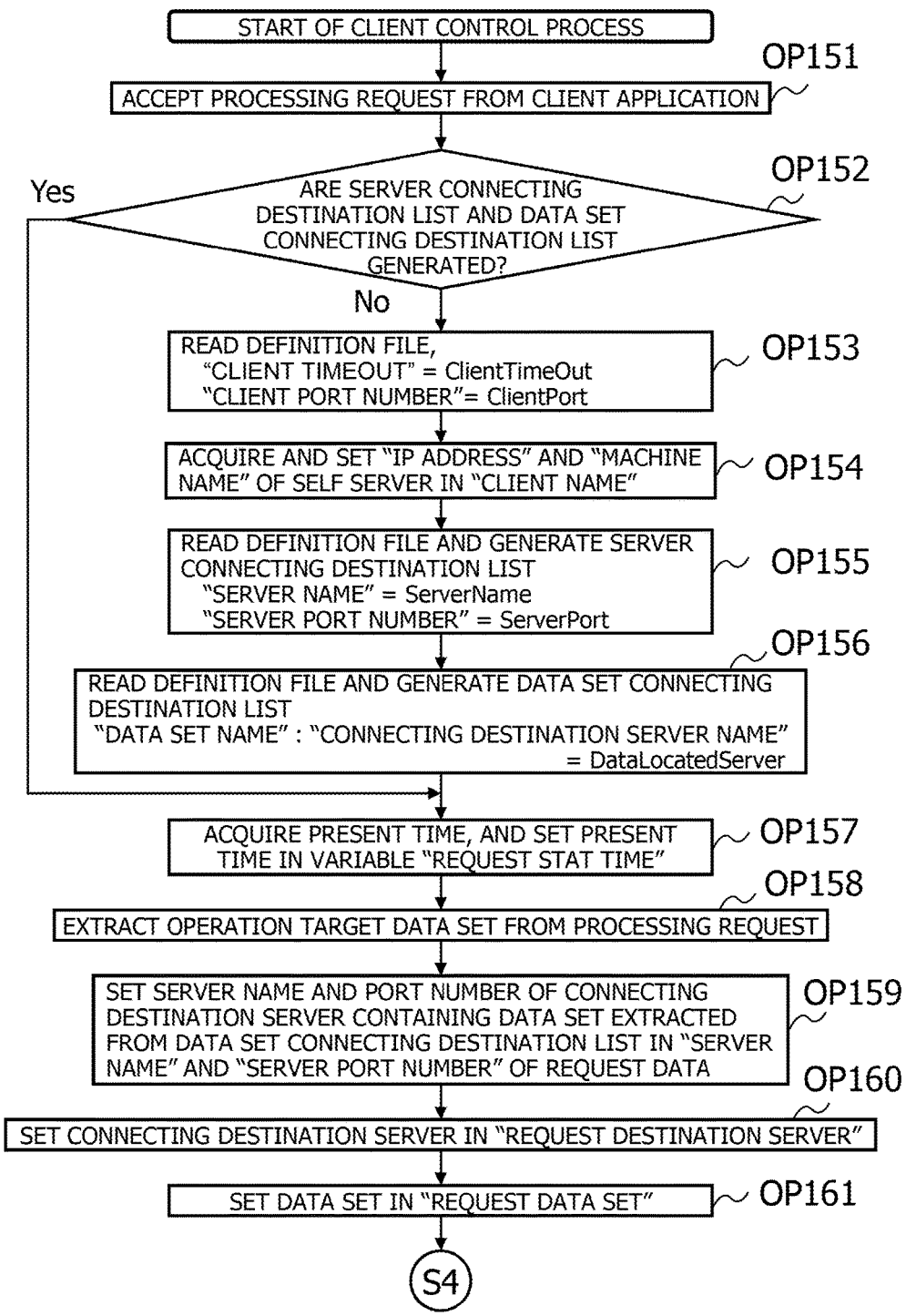
FIG. 38A is a flowchart, given as one example, of a client control process.

FIGS. 37A and 37B are each one example of the flowchart of the processing operation based on the request data. FIGS. 37A and 37B each illustrate details of the processing operation based on the request data in OP99 of FIG. 36A. The server apparatus 2a executes processes in OP121 through OP126 in FIG. 37A, and processes in OP131 through OP142 in FIG. 37B.

In OP121 of FIG. 37A, the server apparatus 2a determines whether the processing operation based on the request data is a commit process. When the processing operation based on the request data is the commit process (OP121: Yes), the processing diverts to OP123. Whereas when the processing operation based on the request data is not the commit process (OP121: No), the processing advances to OP122.

In OP122, the server apparatus 2a determines whether the processing operation is a rollback process. When the processing operation is the rollback process (OP122: Yes), the processing diverts to OP125. Whereas when the processing operation is not the rollback process (OP122: No), the processing advances to S3 in FIG. 37B.

In OP123, the server apparatus 2a reads the transaction log with the processing operation being the commit process, the log being associated with the "transaction ID". Next, the processing advances to OP124. In OP124, the server apparatus 2a writes the differential data associated with the "transaction ID" to the data set. Subsequently, the processing advances to OP125.

In OP125, the server apparatus 2a deletes the transaction log associated with the "transaction ID". Next, the processing advances to OP126. In OP126, the server apparatus 2a deletes the "transaction ID" from the data migration list, and finishes the processing operation based on the request data.

FIG. 37B illustrates a process in such an instance that the processing operation of the request data is neither commit process nor rollback process. The processing advances to OP131 next to S3 in FIG. 37A. In OP131, the server apparatus 2a reads the transaction log associated with the "transaction ID". Next, the processing advances to OP132.

In OP132, the server apparatus 2a performs the processing operation of the request data for the data set in which the differential data of the transaction log is reflected. Subsequently, the processing advances to OP133. In OP133, the server apparatus 2a determines whether the processing operation of the request data becomes successful. When the processing operation of the request data becomes successful (OP133: Yes), the processing advances to OP134. Whereas when the processing operation of the request data results in a failure (OP133: No), the processing diverts to OP140.

In OP134, the server apparatus 2a determines whether a new transaction occurs. When the transaction occurs (OP134: Yes), the processing advances to OP135. Whereas when the transaction does not occur (OP134: No), the processing diverts to OP139.

In OP135, the server apparatus 2a generates the transaction log of the transaction having occurred in OP134. Next, the processing advances to OP136. In OP136, the server apparatus 2a sets the "transaction ID" in the connection information. Subsequently, the processing advances to OP137.

In OP137, the server apparatus 2a determines whether "ON" is set in the "migration source server flag" and the transaction occurs in the operation target data set. When "ON" is set in the "migration source server flag" and when the transaction occurs in the operation target data set and (OP137: Yes), the processing advances to OP138. When "ON" is not set in the "migration source server flag" or when the transaction does not occur in the operation target data set (OP137: No), the processing diverts to OP139.

In OP138, the server apparatus 2a sets the "transaction ID" for the operation target data set in the data migration list. Next, the processing advances to OP139. In OP139, the server apparatus 2a reflects an update difference of the data set in the transaction log, and finishes the processing operation based on the request data.

When the processing operation of the request data does not become successful in OP133, the server apparatus 2a, the processing diverts to OP140. When the time set to the "server timeout" elapses from the "acceptance time" of the request data in OP113 of FIG. 36B, the processing diverts to OP140. In OP140, the server apparatus 2a determines whether the transaction is rolled back. When the transaction is rolled back (OP140: Yes), the processing advances to OP141. Whereas when the transaction is not rolled back (OP140: No), the processing operation based on the request data comes to an end.

In OP141, the server apparatus 2a deletes the transaction log associated with the "transaction ID". Next, the processing advances to OP142. In OP142, the server apparatus 2a deletes the "transaction ID" from the data migration list, and finishes the processing operation based on the request data.

Figure 38B:
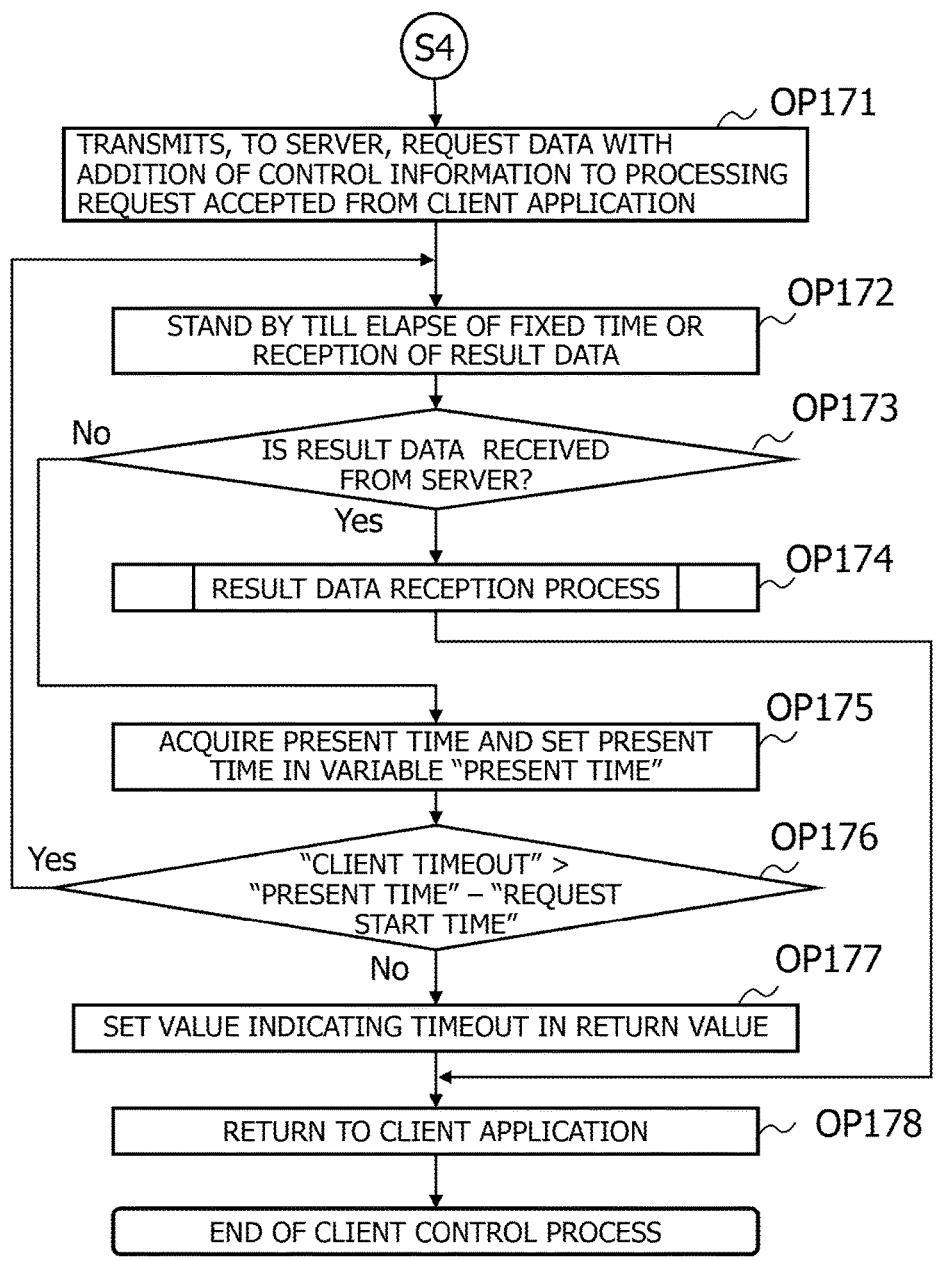
FIG. 38B is a flowchart, given as one example, of the client control process.
Figure 39:
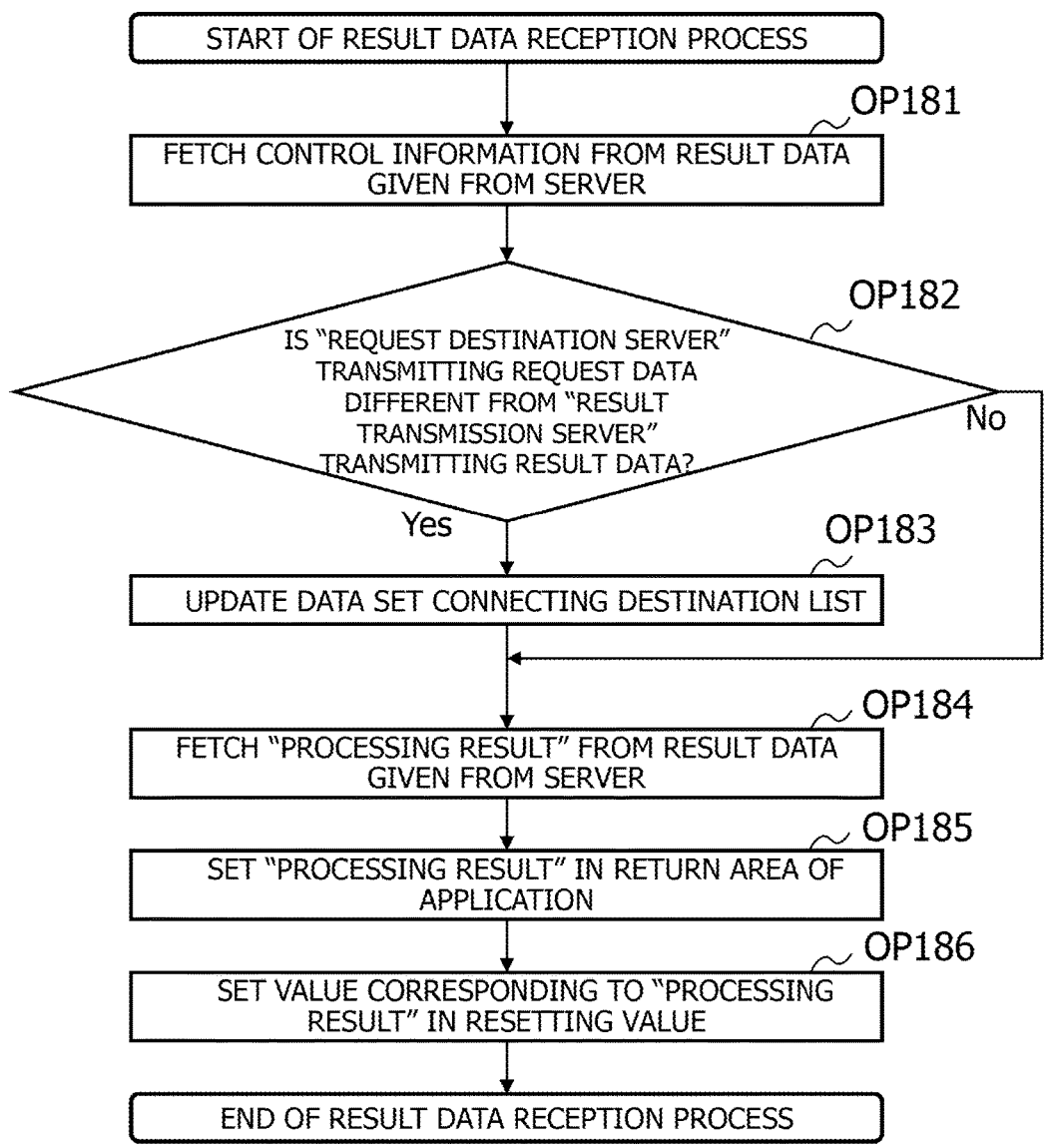
FIG. 39 is a flowchart, given as one example, of a result data reception process.

FIGS. 38A and 38B are each one example of the flowchart of the client control process. The client control process includes a process of updating the connecting destination information of the data set by generating and transmitting the request data to the server apparatus 2a and receiving the result data. A start of the client control process is triggered by starting up, e.g., the client application. In OP151, the client apparatus 2b accepts the processing request from the client application. Next, the processing advances to OP152.

In OP152, the client apparatus 2b determines whether the server connecting destination list and the data set connecting destination list are generated. When the server connecting destination list and the data set connecting destination list are generated (OP152: Yes), the processing diverts to OP157. Whereas when the server connecting destination list and the data set connecting destination list are not generated (OP152: No), the processing advances to OP153.

In OP153, the client apparatus 2b reads the setting values of the definition parameters from the definition file 41a of the client apparatus 2b, and sets the setting values in the variables. Concretely, the client apparatus 2b sets the setting values of "ClientTimeOut" and "ClientPort" in the "client timeout" field and the "client port number" field. Subsequently, the processing advances to OP154. In OP154, the client apparatus 2b acquires the "IP address" or the "machine name", and enters the acquired value in the "client name" field. Subsequently, the processing advances to OP155.

In OP155, the client apparatus 2b reads the definition file 41b of the client apparatus 2b, and generates the server connecting destination list. To be specific, the client apparatus 2b enters the setting values of "ServerName" and "ServerPort" in the "server name" field and the "port number" field of the server connecting destination information in the server connecting destination list. When the plurality of servers is defined in the definition file 41b of the client apparatus 2b, the client apparatus 2b enters the associated setting values in the "server name" field and the "port number" field of the server connecting destination information with respect to the respective servers. Next, the processing advances to OP156.

In OP156, the client apparatus 2b generates the data set connecting destination list by reading the definition file 41b of the client apparatus 2b. Specifically, the client apparatus 2b enters, based on the setting values of "DataLocated-Server", values in the "data set name" field and the "connecting destination server name" of the combination of the data set and the connecting destination in the data set connecting destination list. When the plurality of data sets is defined in the definition file 41b of the client apparatus 2b, the client apparatus 2b enters the associated setting values in the "data set name" field and the "connecting destination server name" field of the combination of the data set and the connecting destination with respect to the respective data sets. Subsequently, the processing advances to OP157.

In OP157, the client apparatus 2b acquires the present time and sets the time value in the "request start time". Next, the processing advances to OP158. In OP158, the client apparatus 2b extracts the operation target data set from the processing request. Next, the processing advances to OP159.

In OP159, the client apparatus 2b enters the server name and the port number of the connecting destination server having the data set extracted from the data set connecting destination list in the "server name" field and the "server port number" field of the request data. Next, the processing advances to OP160.

In OP160, the client apparatus 2b enters the connecting destination server of OP159 in a "request destination server" field. Subsequently, the processing advances to OP161. In OP161, the client apparatus 2b enters the data set of OP159 in a "request data set" field, and the processing diverts to S4 in FIG. 38B.

The processing advances to OP171 next to S4 in FIG. 38B. In OP171, the client apparatus 2b transmits, to the server apparatus 2a, the request data with the control information added to the processing request accepted from the client application. Items of the control information contains are the "server name", the "server port number", the "client name", the "client port number" and the "request data number", and other equivalent items of the request data. Subsequently, the processing advances to OP172.

In OP172, the client apparatus 2b stands by till the fixed period of time elapses or the result data is received. The fixed period of time is, e.g., time that is one tenth (1/10) of the "client timeout". Next, the processing advances to OP173.

In OP173, the client apparatus 2b determines whether the result data is received from the server apparatus 2a. When the result data is received from the server apparatus 2a (OP173: Yes), the processing advances to OP174. Whereas when the result data is not received from the server apparatus 2a (OP173: No), the processing advances to OP175.

In OP174, the client apparatus 2b executes a result data reception process. Subsequently, the processing diverts to OP178. In OP175, the client apparatus 2b acquires the present time, and sets this time value in the "present time". Next, the processing advances to OP176.

In OP176, the client apparatus 2b determines whether a relation of "Client Timeout>Present Time−Request Start Time" is established. In other words, the client apparatus 2b determines whether the reception waiting time of the result data from the server apparatus 2a is shorter than the predetermined period of time. When the reception waiting time is shorter than the predetermined period of time (OP176: Yes), the processing loops back to OP172. Whereas when the reception waiting time is equal to or longer than the predetermined period of time (OP176: No), the processing advances to OP177.

In OP177, the client apparatus 2b sets a value indicating the timeout in a returned value. Next, the processing advances to OP178. In OP178, the client apparatus 2b returns to the client application to finish the client control process.

FIG. 39 is one example of the flowchart of a result data reception process. FIG. 39 illustrates details of the result data reception process in OP174 of FIG. 38B. In OP181, the client apparatus 2b fetches control information from the result data received from the server apparatus 2a. Items of control information are a "request destination server name", a "result transmission server name" and other equivalent items of the result data. Next, the processing advances to OP182.

In OP182, the client apparatus 2b determines whether the "request destination server" having transmitted the request data is different from the "result transmission server" having transmitted the result data. To be specific, it may be sufficient that the client apparatus 2b determines whether the "request destination server" set in OP160 of FIG. 38A is different from the "result transmission server name" of the result data received from the server apparatus 2a. When the "request destination server" is different from the "result transmission server" (OP182: Yes), the processing advances to OP183. Whereas when the "request destination server" is identical with the "result transmission server" (OP182: No), the processing advances to OP184.

In OP183, the client apparatus 2b, because of the "request destination server" being different from the "result transmission server", determines that the connecting destination server of the data set have been changed, and updates the data set connecting destination list. In other words, the client apparatus 2b updates the connecting destination server for the data set to the "result transmission server" from the "request destination server" in the data set connecting destination list. Subsequently, the processing advances to OP184.

In OP184, the client apparatus 2b fetches a "processing result" from the result data received from the server apparatus 2a. Next, the processing advances to OP185. In OP185, the client apparatus 2b sets the "processing result" in a return area of the application. Next, the processing advances to OP186. In OP186, the client apparatus 2b sets a value corresponding to the "processing result" in the resetting value, and finishes the result data reception process.

<Operational Effect of Embodiment>

In the information processing system 1, when enlarging the system scale by a scale-out scheme, the migration source server migrates the migration target data set to an extended migration destination server. The migration source server receives the processing request from the client, and, when the operation target data set has been migrated to the migration destination server, transmits the processing request to the migration destination server. The migration destination server executes, based on the received processing request, a process for the already migrated data set.

The migration destination server transmits a result of the process executed based on the processing request to the client. The processing result contains information purporting that the operation target data set is arranged in the migration destination server. Therefore, the client recognizes that the operation target data set has been migrated to the migration destination server, and can update the arrangement information of the data sets retained by the self client. The information processing system 1 is thereby enabled to scale out the servers by avoiding stopping the processing request given to the server from the client.

The migration destination server, when the migration target data set is currently migrated from the migration source server, executes the process based on the processing request received from the migration source server after completing the migration. Hereat, the migration destination server can execute the process for the operation target data set in the waiting time that is the same as when conducted by the migration source server. In this instance also, the migration destination server transmits the processing result containing the arrangement information of the data sets to the client. The information processing system 1 is thereby enabled to scale out the servers by avoiding stopping the processing request given to the server from the client.

The migration source server, when the operation target data set is currently updated, migrates the differential data containing the update contents of this data set together with the data set to the migration destination server. The migration destination server executes the process based on the processing request given from the client while reflecting the migrated differential data in this data set. Therefore, even when the operation target data set is currently updated, the data set currently updated can be migrated by transmitting the data set together with the differential data. The migration destination server transmits the processing result together with the arrangement information of the data set. The information processing system 1 is thereby enabled to scale out the servers by avoiding stopping the processing request given to the server from the client.

Note that a determination about whether the operation target data set is currently updated, can be made as follows. Upon the occurrence of the transaction for the operation target data set, the migration source server records the "transaction ID" by being associated with the data set in the data migration list. Upon an end of the transaction, the migration source server deletes the "transaction ID" associated with the data set in the data migration list. The migration source server can determine whether the data set is currently updated, depending on whether the "transaction ID" is recorded by being associated with the operation target data set.

Further, the migration source server preferentially migrates the data set not currently updated to the migration destination server. The information processing system 1 is thereby enabled to scale out the servers while restraining influence on the task by avoiding stopping the processing request given to the server from the client.

The information processing system 1 configures a cluster system including the migration source active server and standby server, in which case when the data sets are migrated to the migration destination active server due to the scale-out, the migration destination active server synchronizes with the migration destination standby server. The migration destination active server, when receiving the processing request from the client, executes the process based on the processing request, and transmits the processing result containing the arrangement information of the data sets to the client. The information processing system 1 configuring the cluster system is thereby enabled to scale out the servers by avoiding stopping the processing request given to the server from the client.

The information processing apparatus, the information processing system and the control program, which enable the scale-out by avoiding stopping the processing request given to the server from the client.

<Non-Transitory Recording Medium>

A program for making a computer, other machines and apparatuses (which will hereinafter be referred to as the computer and other equivalent apparatuses) attain any one of the functions can be recorded on a non-transitory recording medium readable by the computer and other equivalent apparatuses. The computer and other equivalent apparatuses are made to read and execute the program on this non-transitory recording medium, whereby the function thereof can be provided.

Herein, the non-transitory recording medium readable by the computer and other equivalent apparatuses connotes a non-transitory recording medium capable of accumulating information instanced by data, programs and other equivalent information electrically, magnetically, optically, mechanically or by chemical action, which can be read from the computer and other equivalent apparatuses. Among these non-transitory recording mediums, the mediums removable from the computer and other equivalent apparatuses are exemplified by a flexible disc, a magneto-optic disc, a CD-ROM, a CD-R/W, a DVD, a Blu-ray disc, a DAT, an 8 mm tape, and a memory card like a flash memory. A hard disc, a ROM and other equivalent recording mediums are given as the non-transitory recording mediums fixed within the computer and other equivalent apparatuses. Still further, a solid state drive (SSD) is also available as the non-transitory recording medium removable from the computer and other equivalent apparatuses and also as the non-transitory recording medium fixed within the computer and other equivalent apparatuses.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising:
 a migration source information processing apparatus including:
 a source memory storing instructions; and
 a source processor, coupled to the source memory, that executes the instructions causing the source processor to:
 forward a processing request from a client apparatus to a migration destination information processing apparatus;

migrate to the migration destination information processing apparatus operation target data not updated;
migrate to the migration destination information processing apparatus operation target data being updated after update of the operation target data being updated is completed; and
store, in the source memory, a record indicating that the operation target data is currently updated when a transaction occurs upon receiving the processing request, and to erase the record upon an end of the transaction; and a migration destination information processing apparatus to accept migration of data from the migration source information processing apparatus, the migration destination information processing apparatus including:
a destination memory storing instructions; and
a destination processor, coupled to the destination memory, that executes the instructions causing a process of:
accessing operation target data as a target of the processing request when the operation target data is migrated from the migration source information processing apparatus and the processing request is received, the processing request being sent to the migration source information processing apparatus from the client apparatus, the processing request being forwarded by the migration source information processing apparatus to the migration destination information processing apparatus; and
transmitting arrangement information of the operation target data to the client apparatus; and the client apparatus including:
a client memory storing instructions; and
a client processor, coupled to the client memory, that executes the instructions causing a process of:
sending the processing request to the migration source information processing apparatus;
receiving the arrangement information; and
changing destination of the processing request from the migration source information processing apparatus to the migration destination information processing apparatus which transmitted arrangement information when the arrangement information is received from the migration destination information processing apparatus.

2. The information processing system according to claim 1, wherein the client apparatus updates arrangement information of data retained on the client apparatus, based on a result of the operation.

3. The information processing system according to claim 1, wherein when the migration source information processing apparatus configures a cluster system in cooperation with a standby migration source information processing apparatus, the migration destination information processing apparatus synchronizes with a standby migration destination information processing apparatus upon accepting migration of the data.

* * * * *